(12) United States Patent
Takahashi et al.

(10) Patent No.: US 10,424,335 B2
(45) Date of Patent: Sep. 24, 2019

(54) INFORMATION REPRODUCTION METHOD AND INFORMATION REPRODUCTION APPARATUS

(71) Applicant: Panasonic Intellectual Property Management Co., Ltd., Osaka (JP)

(72) Inventors: Yoshihisa Takahashi, Osaka (JP); Daisuke Shimoda, Osaka (JP); Masaru Kaida, Osaka (JP); Motoshi Ito, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/229,508

(22) Filed: Dec. 21, 2018

(65) Prior Publication Data
US 2019/0198055 A1    Jun. 27, 2019

(30) Foreign Application Priority Data

Dec. 22, 2017 (JP) ................ 2017-245702

(51) Int. Cl.
*G11B 23/03* (2006.01)
*G11B 23/04* (2006.01)

(52) U.S. Cl.
CPC ........ *G11B 23/0317* (2013.01); *G11B 23/046* (2013.01); *G11B 2220/2537* (2013.01); *G11B 2220/41* (2013.01)

(58) Field of Classification Search
CPC ............. G11B 23/0317; G11B 23/046; G11B 2220/41; G11B 2220/2537
See application file for complete search history.

(56) References Cited

U.S. PATENT DOCUMENTS

| | | | | |
|---|---|---|---|---|
| 4,864,511 A | * | 9/1989 | Moy | G06F 3/0601 700/218 |
| 4,928,245 A | * | 5/1990 | Moy | G06F 3/0601 242/338.4 |
| 4,932,826 A | * | 6/1990 | Moy | G06F 3/0601 360/92.1 |
| 5,548,521 A | * | 8/1996 | Krayer | G06K 17/0012 235/375 |
| 6,351,685 B1 | * | 2/2002 | Dimitri | G11B 15/689 414/273 |
| 9,613,649 B1 | | 4/2017 | Shimoda et al. | |

(Continued)

FOREIGN PATENT DOCUMENTS

JP    2017-174488    9/2017

*Primary Examiner* — Brian E Miller
(74) *Attorney, Agent, or Firm* — Wenderoth, Lind & Ponack, L.L.P.

(57) ABSTRACT

An information reproduction apparatus includes plural magazines in which optical discs are set, plural drives for performing recording and reproduction on an optical disc set therein, a changer mechanism that transports a magazine between its setting position and one or more drives and mounts and remove a prescribed optical disc or discs in and from the one or more drives by performing either one of a single move process and a multi-move process, and a controller. The controller judges whether to conduct the single move process or the multi-move process based on a reading data list and use statuses of the respective drives.

8 Claims, 20 Drawing Sheets

(56) References Cited

U.S. PATENT DOCUMENTS

| | | | |
|---|---|---|---|
| 2010/0114361 A1* | 5/2010 | Starr | G11B 15/6835 |
| | | | 700/214 |
| 2016/0196072 A1* | 7/2016 | Smith | G06F 3/0686 |
| | | | 711/112 |
| 2016/0210047 A1* | 7/2016 | Kobayashi | G06F 3/061 |
| 2018/0130490 A1* | 5/2018 | Takahashi | G11B 17/08 |

* cited by examiner

FIG. 11

| (FROM THE TOP) | ELEMENT ADDRESS | Magazine1 | ELEMENT ADDRESS | Magazine2 | ELEMENT ADDRESS | Magazine3 | ELEMENT ADDRESS | Magazine4 |
|---|---|---|---|---|---|---|---|---|
| 1ST DISC | 0 | | 12 | | 24 | | 36 | 4 |
| 2ND DISC | 1 | 3 | 13 | | 25 | | 37 | |
| 3RD DISC | 2 | | 14 | | 26 | | 38 | |
| 4TH DISC | 3 | | 15 | 2 | 27 | | 39 | |
| 5TH DISC | 4 | | 16 | | 28 | | 40 | |
| 6TH DISC | 5 | | 17 | | 29 | | 41 | |
| 7TH DISC | 6 | | 18 | | 30 | | 42 | |
| 8TH DISC | 7 | | 19 | | 31 | | 43 | |
| 9TH DISC | 8 | 1 | 20 | | 32 | | 44 | 5 |
| 10TH DISC | 9 | | 21 | | 33 | | 45 | |
| 11TH DISC | 10 | | 22 | | 34 | | 46 | |
| 12TH DISC | 11 | 6 | 23 | | 35 | | 47 | |

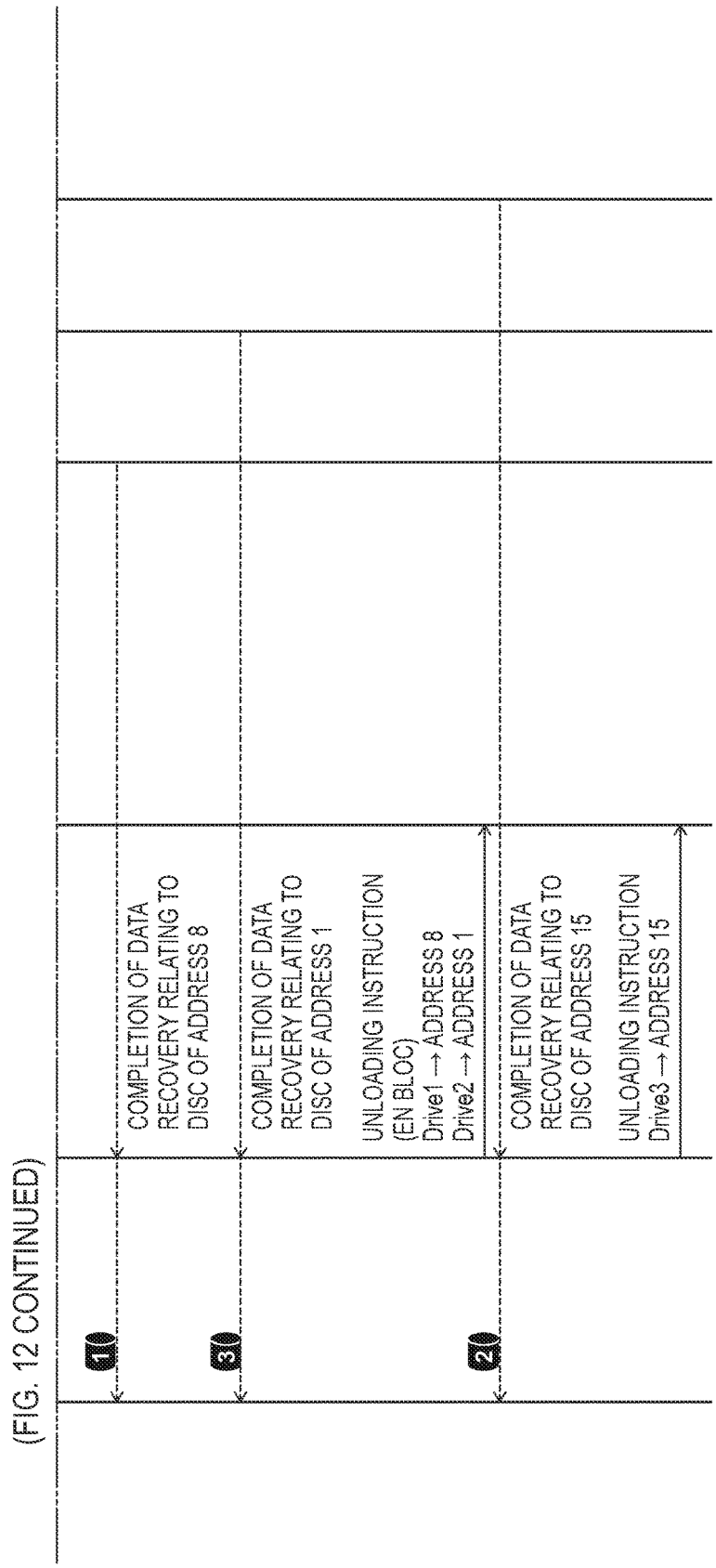

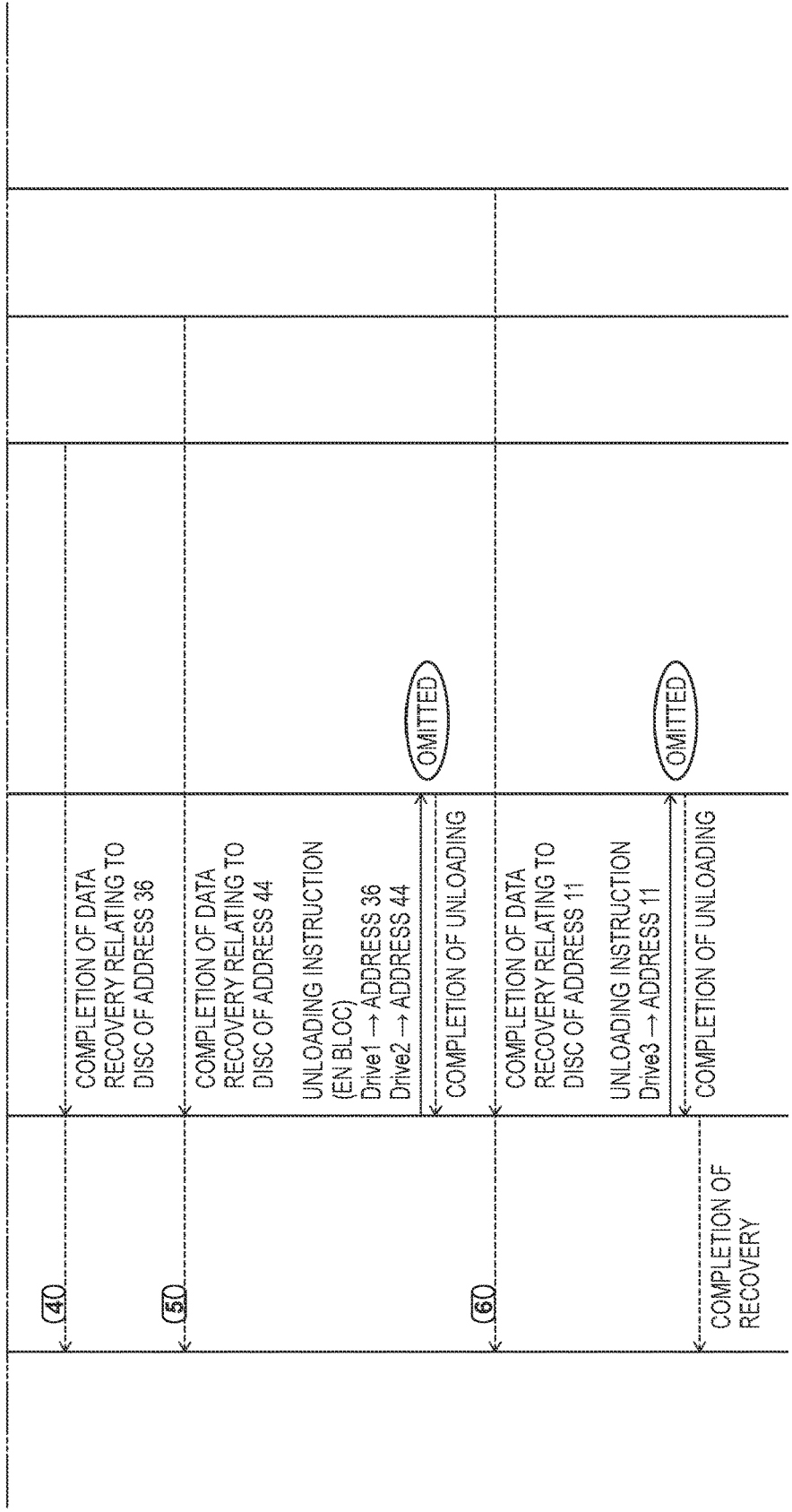

INFORMATION REPRODUCTION METHOD AND INFORMATION REPRODUCTION APPARATUS

CROSS REFERENCE TO RELATED APPLICATIONS

This application is based on Japanese Patent Application (No. 2017-245702) filed on Dec. 22, 2017, the contents of which are incorporated herein by reference.

BACKGROUND OF THE INVENTION

1. Field of the Invention

The present disclosure relates to an information reproduction apparatus in which plural discs are set, transports a desired disc from its setting location and mounts it in a drive, and reproduces information from the disc mounted in the drive as well as an information reproduction method of that information reproduction apparatus.

2. Description of the Related Art

JP-A-2017-174488 discloses the following. A disc apparatus (information recording/reproduction apparatus) is an optical disc storage using optical discs that are set in cartridge-type magazines. The disc apparatus includes plural modules, changer mechanisms such as a carrier unit moving mechanism which moves spanning carrier units that hold discs and plural modules, and plural drives for performing recording and reproduction on an optical disc. Using the above constituent elements, an optical disc that is set in a magazine of the disc apparatus is transported and mounted in a drive and data is recorded on or reproduced from the disc. The movement distance can be shortened and the risk of occurrence of a failure can be reduced by making disc transport operations of the changer mechanisms more efficient and decreasing the number of operations.

Among storage systems, optical disc storages in particular which are frequently used for backing up main data are required to enable high-speed recovery of part of main data (data recovery) should, for example, those data are damaged or lost. The requirement remains the same even in a case that data are recorded discretely in separate optical discs using erasure codding which has recently come to be employed frequently to secure necessary redundancy in particular.

Furthermore, in certain uses, data to be used for data recovery are given priority ranks. In this case, while data that are high in priority are used for data recovery earlier, data recovery is required to be performed at high speed using all necessary data.

SUMMARY OF THE INVENTION

In view of the above, the present application is intended to provide an information reproduction method and an information reproduction apparatus that enable recovery using (i.e., reading out) necessary data while taking priority ranks into consideration even in a case that data are recorded discretely in separate optical discs using erasure coding or the like.

The present disclosure discloses an information reproduction method for reading out data from a disc apparatus containing plural optical discs as information recording media, wherein the disc apparatus is configured to set plural magazines therein at respective setting positions of the disc apparatus;

wherein the optical discs are set in the magazines in each of which plural optical discs can be set;

wherein the disc apparatus includes:

plural drives each of which is configured to perform recording and reproduction on an optical disc set therein; and a changer mechanism configured to transport a magazine between its setting position and one or more drives and mounts and remove a prescribed optical disc or discs in and from the one or more drives by performing either one of a single move process and a multi-move process;

wherein in the single move process, a prescribed optical disc that is set in the magazine is transported and mounted in and released from the drive while the magazine is reciprocated once between its setting position and the drive;

wherein in the multi-move process, prescribed N optical discs that are set in the magazine are transported and mounted in and released from N respective drives while the magazine is reciprocated once between its setting position and the drives, N being an integer that is larger than or equal to 2, the information reproduction method, comprising:

judging whether to conduct the single move process or the multi-move process as a transport process for transporting optical discs to respective drives to read data from them based on use statuses of the respective drives and a reading data list, the reading data list containing disc information that enables identification of optical discs storing reading data to be read out, area information relating to areas, where the reading data are recorded, on the optical discs indicated by the disc information, and priority information indicating priority ranks of the reading data; and controlling the disc apparatus so that data are read out preferentially in the order of high priority rank indicated by the priority information.

The information reproduction method and the information reproduction apparatus disclosed in this application can read, at high speed, all data that need to be read out for data recovery while taking priority ranks into consideration.

BRIEF DESCRIPTION OF THE DRAWINGS

FIG. 11 is an imagery diagram illustrating a specific arrangement, in the disc apparatus, of data indicated by the recovery table shown in FIG. 10.

DETAILED DESCRIPTION OF THE EXEMPLARY EMBODIMENTS

An embodiment will be hereinafter described in detail with reference to the drawings when necessary. However, unnecessarily detailed descriptions will be avoided. For example, a detailed description of a well-known item will be omitted and an element having substantially the same one already described will not be described in a duplicated manner. This is to prevent the following description from becoming unnecessarily redundant and to facilitate understanding of those skilled in the art.

The inventors provide the following description and the accompanying drawings to allow those skilled in the art to understand the present disclosure fully and do not intend that they restrict the subject matter set forth in the claims.

Embodiment

Figure 1:
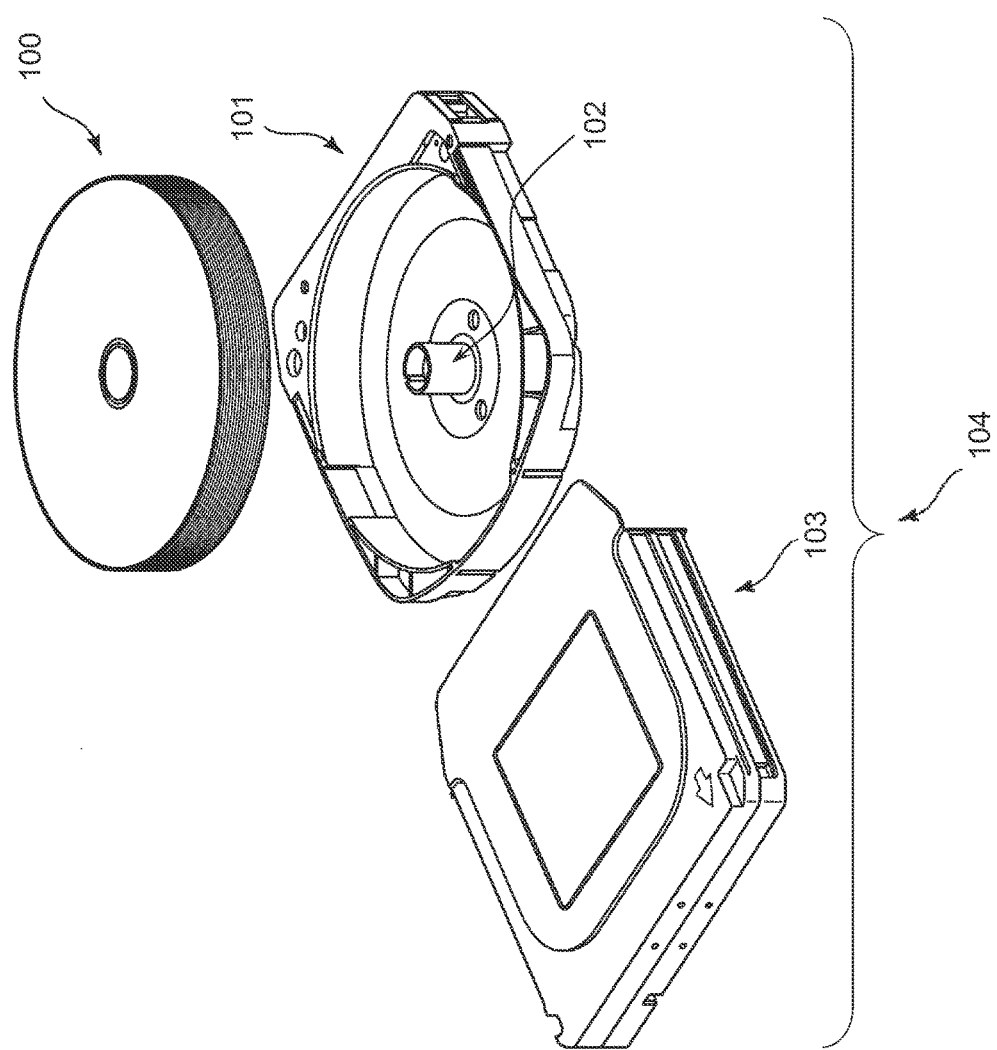
FIG. 1 illustrates how plural optical discs are housed in a magazine in such a manner as to be stacked in their thickness direction.

FIG. 1 illustrates how plural optical discs 100 are set in a magazine 104 in such a manner as to be stacked in their thickness direction. The magazine 104 is composed of the plural optical discs 100, a magazine tray 101, and a tray holder 103. The magazine tray 101 houses the plural optical discs 100 in such a manner that they are stacked in their thickness direction (i.e., the direction that is perpendicular to the recording surfaces of the optical discs 100). The magazine tray 101 holds the plural optical discs 100 by an axial rod 102 that is inserted through the center holes of the optical discs 100 and prevents each optical disc 100 from moving parallel with its surfaces. The tray holder 103 houses the magazine tray 101 that holds the plural optical discs 100.

Figure 2:
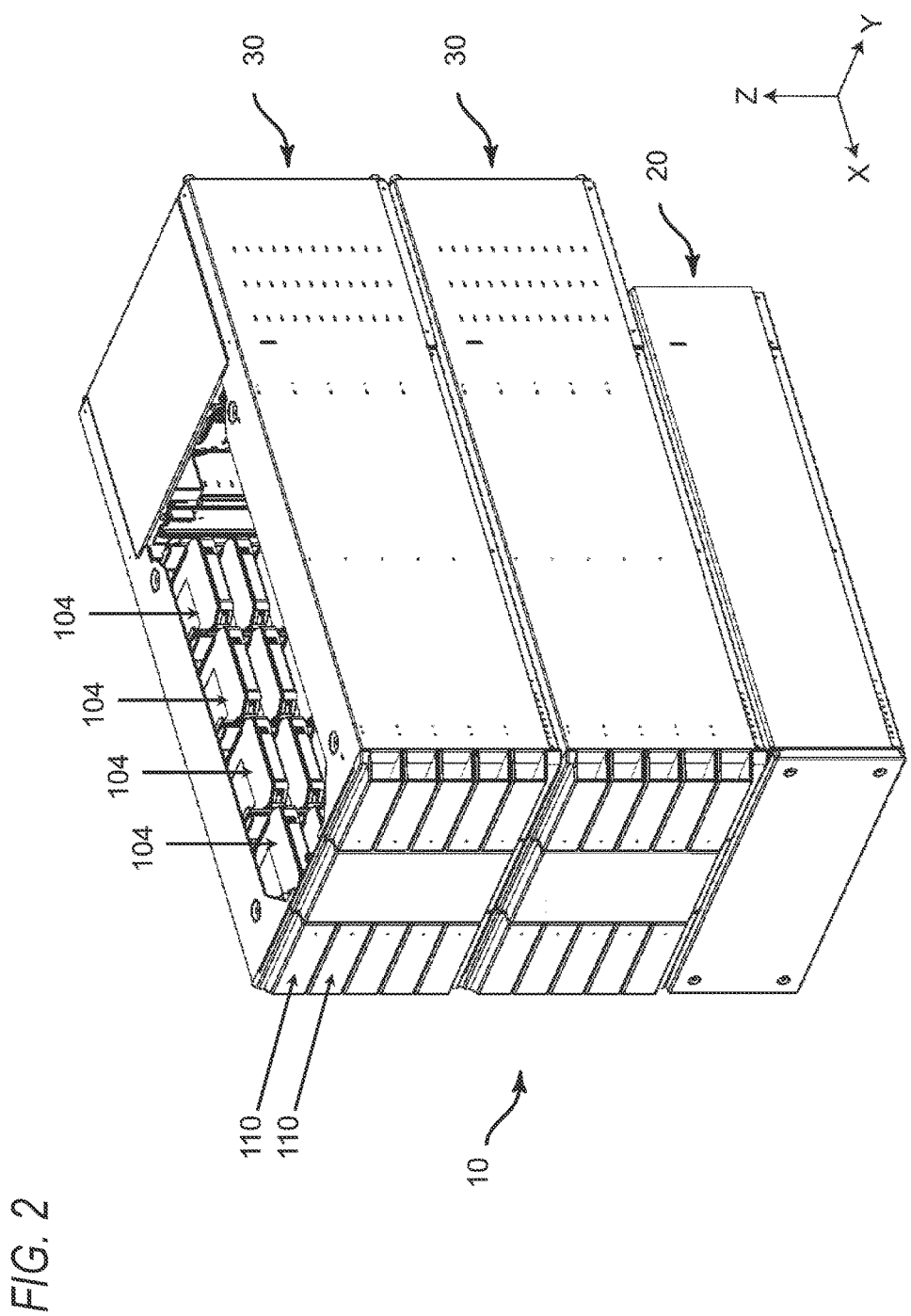
FIG. 2 illustrates the configuration of a disc apparatus.

FIG. 2 illustrates the configuration of a disc apparatus 10, which is an optical disc storage apparatus for recording and reproducing information on and from the optical discs 100. The disc apparatus 10 includes plural modules which are approximately shaped like a cuboid, for example, three modules that are one bottom module 20 and two drive modules 30 (see FIG. 2). Although the disc apparatus 10 shown in FIG. 2 has three modules, in the embodiment the number of modules is not restricted; it suffices that the disc apparatus 10 according to the embodiment be equipped with the bottom module 20 and at least one drive module 30.

One or more drawers 110 are set in each drive module 30 in a detachable manner. For example, in the example shown in FIG. 2, 10 drawers 110 (five drawers 110 on each of the left side and the right side) are set in each drive module 30. Each drawer 110 includes one or more slots (not shown) in which a magazine 104 can be set. For example, in the example shown in FIG. 2, each drawer 110 includes four slots and hence can accommodate four magazines 104. The number of drawers 110 that can be set in one drive module 30 and the number of magazines 104 that can be set in one drawer 110 are optional. Any magazine 104 in the disc apparatus 10 can be removed by drawing out the drawer 110 in which that magazine 104 is set. It is possible to offline-manage a removed magazine 104 by putting it on a shelf, for example.

Figure 3:
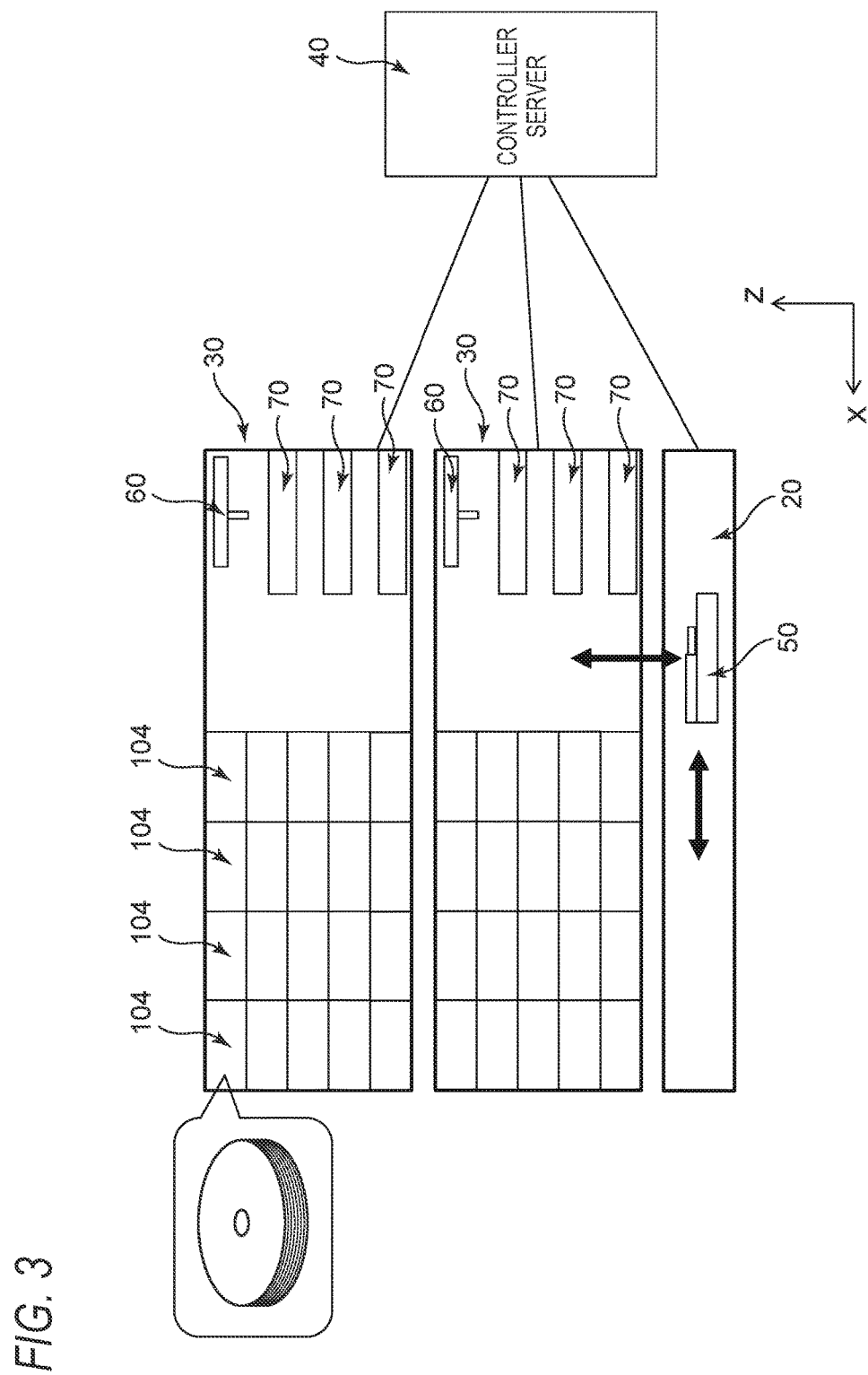
FIG. 3 is a schematic diagram of the disc apparatus as seen from the side.

FIG. 3 is a schematic diagram of the disc apparatus 10 as seen from the side. How the disc apparatus 10 operates will be described in detail with reference to FIG. 3. The bottom module 20 includes a magazine carrier unit 50 (hereinafter referred to as an "MCU 50"). The MCU 50 is a mechanism for pulling out a magazine 104 (more specifically, magazine tray 101) that is disposed in a drive module 30 and transporting optical discs 100 to a disc carrier unit (hereinafter referred to as a "DCU 60"; described later) and for, conversely, putting optical discs 100 received from the DCU 60 into a magazine 104 and returning the magazine 104 to its slot of a drawer 110.

The MCU 50 can move in the top-bottom direction (Z-axis direction) of the disc apparatus 10 spanning the drive modules 30 and move in the front-rear direction (X-axis direction) within each drive module 30. To enable such mechanical operations, the MCU 50 includes a microcomputer (not shown).

Each drive module 30 includes one or more optical disc drives 70 for performing recording and reproduction on an optical disc 100 and a DCU 60 which is a changer mechanism for transferring optical discs 100 to or from the magazine 104 transported by the MCU 50 and mounting or taking out an optical disc 100 in or from an optical disc drive 70. Plural magazines 104 can be set in each drive module 30.

The DCU 60 is a changer mechanism having functions of acquiring one or more optical discs 100 from a magazine 104 transported by the MCU 50 so that a desired optical disc 100 is located at the lowest position and mounting the lowest optical disc 100 in a target optical disc drive 70 and, conversely, acquiring the optical disc 100 mounted in an optical disc drive 70 and returning it to a magazine 104. To enable such mechanical operations performed by itself, the DCU 60 includes a microcomputer (not shown).

In the above-described manner, transport of an optical disc 100 between a magazine 104 and an optical disc drive 70 is realized by the MCU 50 and the DCU 60 (changer mechanisms). In the embodiment of the invention, each drive module 30 includes three optical disc drives 70. There are no particular limitations on the number of optical disc drives 70 provided in each drive module 30 except for a space-related limitation. However, as described later, the larger the number of optical disc drives 70 covered by one DCU 60 is, the better the performance (processing ability) is. The efficiency is high if the number of optical disc drives 70 provided in each drive module 30 is a divisor of the number (12) of optical discs 100 that are set in each magazine 104.

For certain uses, there may occur a demand that many magazines 104 be set in the disc apparatus 10 whereas a high transfer rate is not required or there is little desire for simultaneous access to plural optical disc drives 70. In view of this, the disc apparatus 10 may be equipped with such a module as a magazine module (not shown) in which only plural magazines 104 can be set (i.e., the DCU 60 and the optical disc drives 70 are removed).

The disc apparatus 10 is controlled via a controller server 40, for example. The bottom module 20 and the drive modules 30 are connected to the controller server 40 by USB cables and/or SAS (SATA) cables, for example. More specifically, for example, the mechanisms such as the MCU 50 in the bottom module 20 and the DCU 60 in each drive module 30 are controlled from the controller server 40 via a USB interface. Each optical disc drive 70 is controlled from the controller server 40 via a SAS (SATA) interface.

Although in the embodiment of the invention the controller server 40 is provided separately for control of the disc apparatus 10 and connected to the disc apparatus 10 by USB cables and/or SAS (SATA) cables, the invention need not always employ this mode. More specifically, for example, a CPU that is equivalent to a controller may be provided inside the disc apparatus 10 or inside the bottom module 20 or a drive module 30.

As described above, to perform recording or reproduction on a prescribed optical disc 100 mounted in the disc apparatus 10, it is necessary to mount, in an optical disc drive 70, using mechanisms such as the MCU 50 and a DCU 60, the prescribed optical disc 100 that is set in a magazine 104. In particular, whereas the plural optical disc drives 70 and the plural DCUs 60 exist in the disc apparatus 10, the disc apparatus 10 includes only one MCU 50 for transporting a magazine 104. Thus, to enhance the data recording/reproduction performance of the disc apparatus 10, it is important to perform, more efficiently, mechanical operations, mainly those of the MCU 50.

Figure 4:
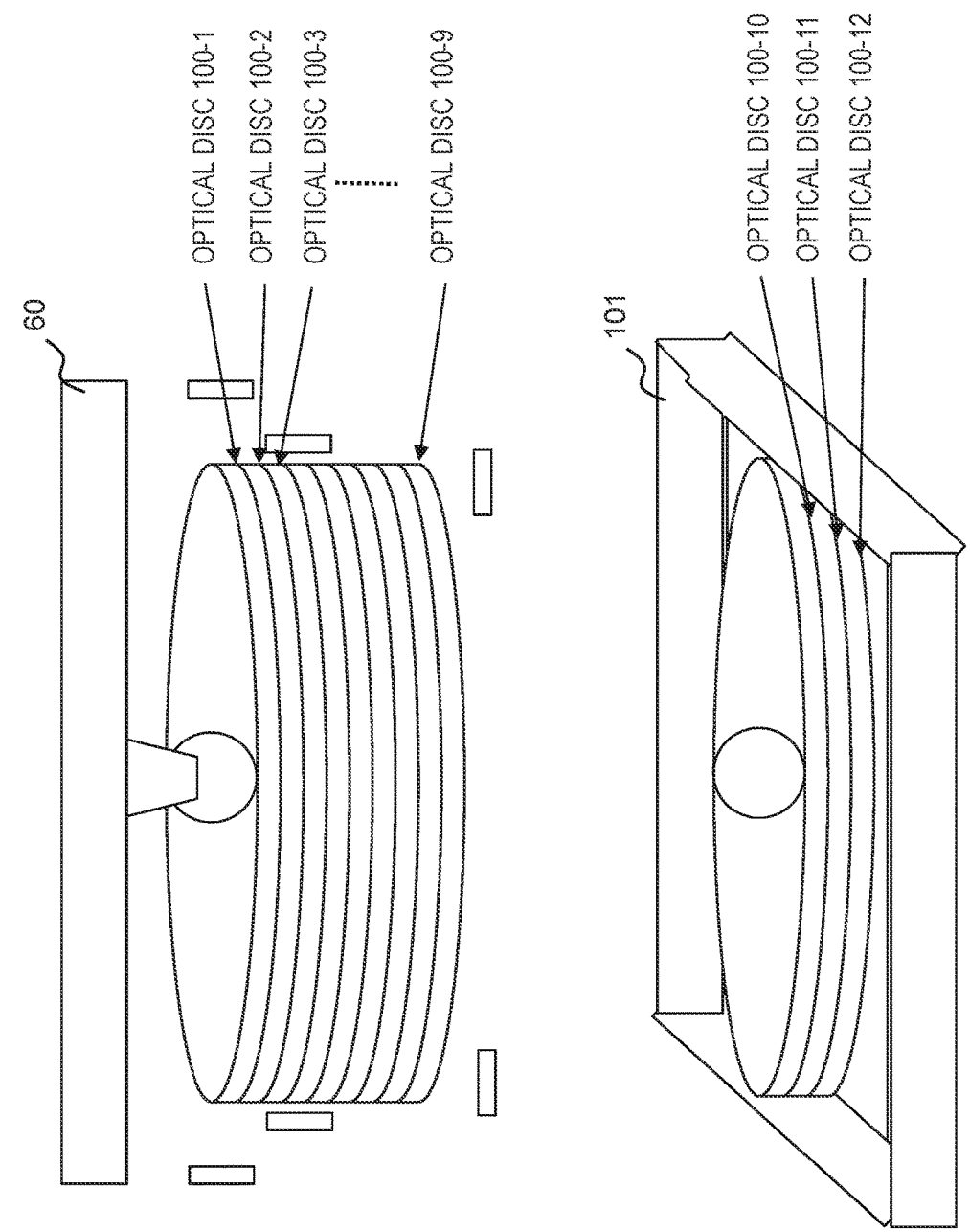
FIG. 4 illustrates an operation that is performed when a DCU takes out optical discs from a magazine.

FIG. 4 illustrates an operation that is performed when a DCU 60 takes out optical discs 100 from a magazine 104. This is an example that the ninth optical disc 100-9 from the top in a magazine 104 is mounted in an optical disc drive 70. The DCU 60 acquires nine optical discs 100 (optical discs 100-1 to 100-9) from the magazine 104 (strictly, magazine tray 101) so that the optical disc 100-9 to be mounted in the optical disc drive 70 is located at the lowest position. Acquiring optical discs 100 in this manner is to give each DCU 60 a function of mounting, in an optical disc drive 70, the lowest one (i.e., one optical disc 100) of the optical discs 100 held by the DCU 60. That is, the manner of acquiring a transport target optical disc 100 depends on the functions of each optical disc 100. At this time point, only three optical discs 100 (optical discs 100-10 to 100-12) remain in the magazine 104.

Then the DCU 60 opens the tray lid of the mounting target optical disc drive 70 and mounts therein the lowest optical disc 100-9 of the optical discs 100 held by itself. After mounting the target optical disc 100, the DCU 60 returns the other optical discs 100 still being held by itself to the magazine 104 in which they were set. As a result, at this time point, 11 optical discs 100 are set in this magazine 104.

Conversely, an opposite operation is performed to return the optical disc 100-9 set in the optical disc drive 70 to the magazine 104 in which it was set. More specifically, first, the DCU 60 acquires, from the magazine 104, eight optical discs 100 (optical discs 100-1 to 100-8) that are located over the position where to return the return target optical disc 100-9. Then the DCU 60 opens the tray lid of the optical disc drive 70 and takes the optical disc 100-9 set there so as to hold it at the lowest position. The DCU 60 thereafter returns the nine optical discs 100 held by itself to the magazine 104.

Figure 5:
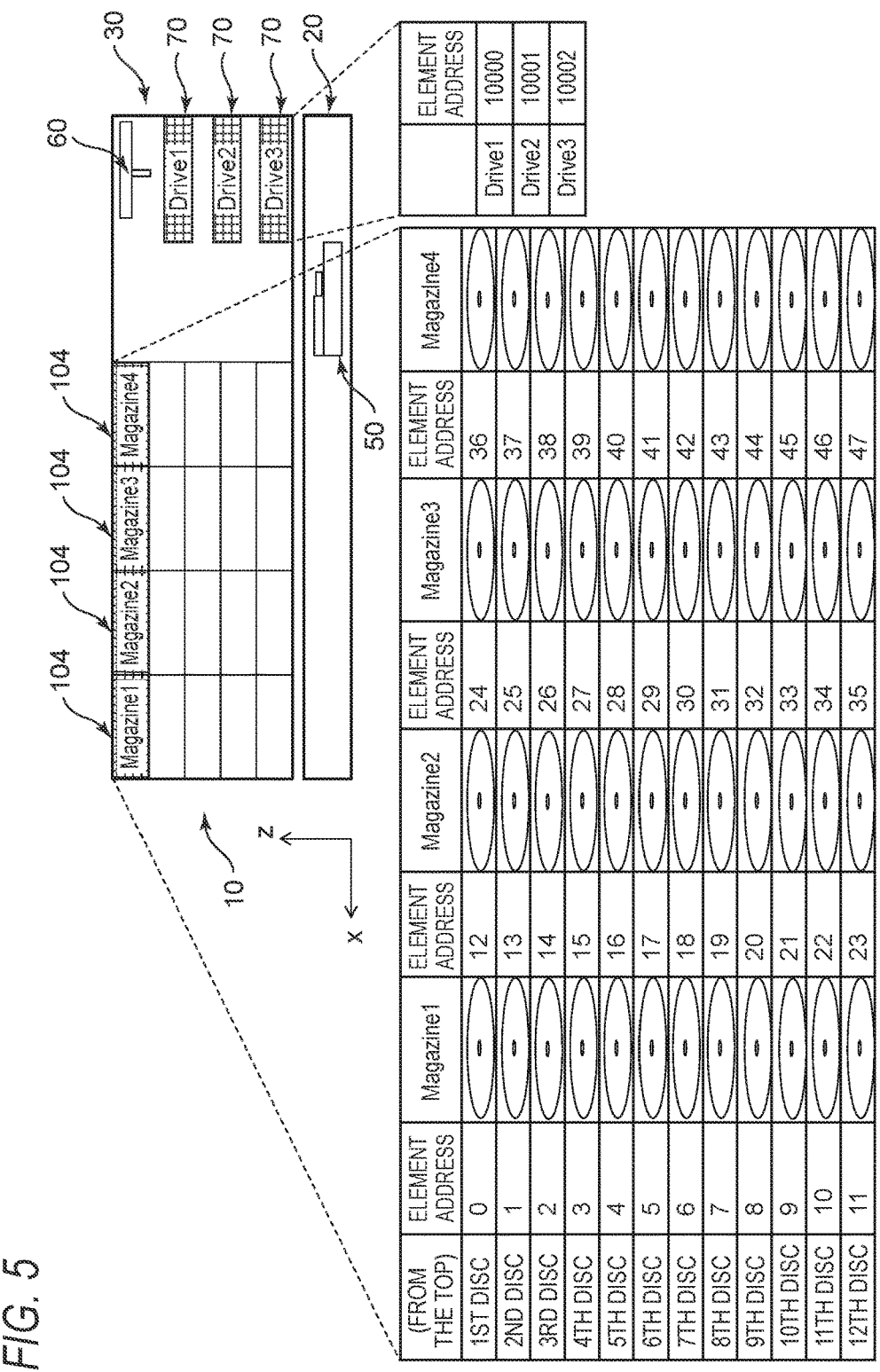
FIG. 5 illustrates example element addresses.

FIG. 5 illustrates element addresses that are assigned in the disc apparatus 10. In general, in changer systems such as the disc apparatus 10 according to the embodiment of the invention, such a mechanical operation as transport of an optical disc 100 is performed using unique pieces of address information called element addresses. The term "element" means a data transfer unit, a storage, or the like. In the disc apparatus 10 according to the embodiment, each optical disc drive 70 is one element as a data transfer unit and each optical disc 100 is one element as a storage.

In the disc apparatus 10 according to the embodiment in which 12 optical discs 100 are set in each magazine 104, 12 element addresses are assigned for each magazine 104. Since plural magazines 104 exist in the disc apparatus 10, a unique element address is assigned to every optical disc 100 that is set in every magazine 104 according to prescribed rules.

For example, as shown in FIG. 5, element addresses are assigned to each of columns of the optical discs 100 set in the magazines 104 accommodated in the slots of each drawer 110 in order from the top to the bottom in the Z-axis direction. Also, the element addresses addressed to the columns of the optical discs 100 are increased from the left end (i.e., the side closer to the drawer take-out opening) to the right end in the X-axis direction. In general, an element address of a storage is assigned to a "location" where the storage is to be set. Thus, element addresses are assigned to the optical discs 100 of a slot where a magazine 104 is not set though it can be set.

Element addresses are also assigned to the optical disc drives 70 in order from the top to the bottom in the Z-axis direction. For example, in mounting a prescribed optical disc 100 in a prescribed optical disc drive 70, a request is issued from a upper layer application to the CPU using element addresses, such as "Transport the optical disc 100 having an element address "0" to the optical disc drive 70 having an element address "10000." The upper layer application is, for example, an application for recording and reproducing data on or from the disc apparatus 10.

The above-described element address assigning method is just an example; element addresses may be assigned according to any set of rules.

The disc apparatus 10 is provided with two methods for transporting an optical disc(s) 100 between a slot (magazine 104) and an optical disc drive(s) 70 by the changer mechanisms, that is, a single move process and a multi-move process.

Figure 6:
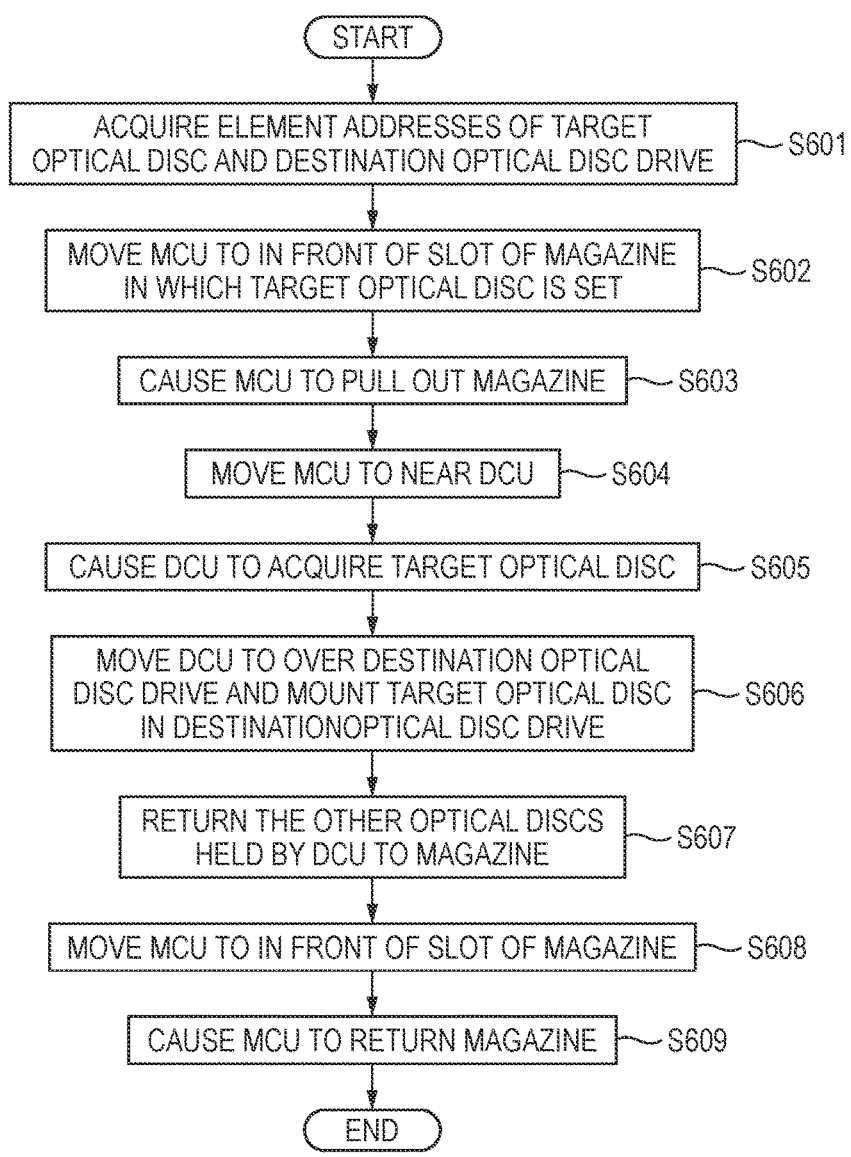
FIG. 6 is a flowchart showing the procedure of a single move process.

FIG. 6 is a flowchart showing the procedure of a single move process for mounting one optical disc 100 in one optical disc drive 70. For example, this process is executed in such a manner that software that is based on this flowchart and runs on a computing integrated circuit such as a CPU (central processing unit) controls the individual mechanisms, such as the MCU 50, of the disc apparatus 10 triggered by a request from the upper layer application (not shown) or the like. The upper layer application may exist in either the controller server 40 or another upper layer server (not shown) that is connected to the controller server 40 via an interface of iSCSI, FC (Fiber Channel), or the like.

The disc apparatus 10 is provided with a function called a "scan" because it is necessary to recognize, in advance, in what slot a target magazine 104 is set in transporting an optical disc 100. More specifically, an RFID is assigned or a barcode or the like is stuck to each magazine 104 and the MCU 50, for example, includes an RFID reader, a barcode reader (neither is shown), or the like, whereby a function of recognizing whether a magazine 104 is set at the slot position of each drawer 110 is realized. This function is performed when, for example, the disc apparatus 10 is powered on, a drawer 110 is closed, or a scan instruction comes from the upper layer application or a user. The procedure shown in FIG. 6 will be described below with an assumption that a scan operation for checking whether the magazines 104 are set at the respective slot positions in the disc apparatus 10 has already been executed by the CPU.

To make it specific, the following description will be directed to an example case that a request for causing the optical disc 100 having an element address "8," that is, the ninth optical disc 100 from the top currently existing in Magazine1 (see FIG. 5), to be mounted in the optical disc drive 70 having an element address "10000," that is, the highest optical disc drive 70 (Drive 1) in the drive module 30 (see FIG. 5), has occurred in the disc apparatus 10 having the configuration shown in FIG. 5.

Step S601: The CPU recognizes a transport target optical disc 100 and a transport destination optical disc drive 70. More specifically, for example, the CPU acquires an element address of the transport target optical disc 100 and an element address of the transport destination optical disc drive 70 from a disc transport request, such as a "move medium" command, received from the upper layer application. Even more specifically, the element address of the transport target optical disc 100 is "8" and the element address of the transport destination optical disc drive 70 is "10000."

Step S602: In response to an instruction from the CPU, the MCU 50 is moved to in front of the slot of the magazine 104 in which the target optical disc 100 is set. More specifically, for example, the CPU causes the MCU 50 to be moved to in front of the slot corresponding to the element address of the mounting target optical disc 100 acquired at step S601. Even more specifically, the CPU causes the MCU 50 to be moved to the position in front of Magazine1 of the drive module 30 shown in FIG. 5.

Step S603: In response to an instruction from the CPU, the MCU 50 pulls out, from the drawer 110, the magazine 104 in which the mounting target optical disc 100 is set. More specifically, for example, the CPU instructs the MCU 50 to pull out the magazine 104 (strictly, magazine tray 101) located in front of the MCU 50 that has been moved at step S602 and the MCU 50 acquires the magazine 104. Even more specifically, the MCU 50 acquires the magazine 104 that is referred to as "Magazine1" in FIG. 5.

Step S604: In response to an instruction from the CPU, the MCU 50 transports the magazine 104 to near the DCU 60. More specifically, for example, the CPU instructs the MCU 50 to move the magazine 104 acquired at step S603 to near (i.e., under) the DCU 60 that is installed in the drive module 30 in which the optical disc drive 70 having the transport destination element address acquired at step S601 exists and the MCU 50 transports the magazine 104 there.

Step S605: In response to an instruction from the CPU, the DCU 60 acquires the transport target optical disc 100 from the MCU 50. More specifically, for example, the CPU instructs the DCU 60 to acquire optical discs 100 so that the transport target optical disc 100 becomes the lowest one from a maximum of 12 optical discs 100 that are set in the magazine 104 transported at step S604, that is, to acquire the transport target optical disc 100 and all of the optical discs 100 located over it, and the DCU 60 acquires those optical discs 100 so that the transport target optical disc 100 is located at the lowest position. Even more specifically, the CPU causes the DCU 60 to acquire the nine optical discs 100 in total having element addresses "0" to "8" so that the ninth transport target optical disc 100 having the element address "8" is located at the lowest position from the 12 optical discs 100 that are set in Magazine 1 shown in FIG. 5.

Acquiring optical discs 100 in this manner is to give each DCU 60 a function of mounting, in a transport destination optical disc drive 70, the lowest one (i.e., one optical disc 100) of the optical discs 100 held by the DCU 60. That is, the manner of acquiring a transport target optical disc 100 depends on the functions of each optical disc 100, and may be any manner as long as each DCU 60 can acquire a transport target optical disc 100 in such a manner that it can be mounted in a transport destination optical disc drive 70 at the next step S606.

Step S606: In response to an instruction from the CPU, the DCU 60 mounts the transport target optical disc 100 in the transport destination optical disc drive 70. More specifically, for example, the CPU instructs the DCU 60 to open the tray lid of the mounting destination optical disc drive 70 and mount the lowest one of the optical discs 100 held by itself in the tray of the mounting destination optical disc drive 70, and the DCU 60 mounts the optical disc 100 there. Furthermore, the CPU instructs the mounting destination optical disc drive 70 to close its tray lid and activate itself.

Even more specifically, the CPU causes the DCU 60 holding the optical discs 100 to be moved to over the optical disc drive 70 that is referred to as "Drive 1" in FIG. 5 and open the tray lid of the optical disc drive 70. Subsequently, the CPU causes the DCU 60 to place the lowest one of the optical discs 100 held by itself on the tray of the optical disc drive 70 that is referred to as "Drive 1" in FIG. 5, and causes the optical disc drive 70 to close its tray lid and activate itself to prepare for access to the mounted optical disc 100 mounted therein.

Step S607: In response to an instruction from the CPU, the DCU 60 returns the optical discs 100 held by itself to the magazine 104. More specifically, if the DCU 60 holds one or more optical discs 100 when the execution of step S606 has been completed, the CPU instructs the DCU 60 to return the optical discs 100 held by itself to the magazine 104 and the DCU 60 does so. Even more specifically, for example, where the optical disc 100 having an element address "8" was mounted in the optical disc drive 70, when the mounting has been completed, the DCU 60 is in a state that it holds the other, eight optical discs 100 (having element addresses "0" to "7"). In this case, these optical discs 100 held by the DCU 60 are returned to the magazine 104 held by the MCU 50. If the DCU 60 holds no optical disc 100 when the execution of step S606 has been completed (more specifically, if the highest one of the optical discs 100 that were set in the magazine 104 was mounted in the optical disc drive 70), step S607 is skipped.

Step S608: In response to an instruction from the CPU, the MCU 50 transports the magazine 104 to in front of the target slot. More specifically, for example, to return the magazine 104 held by the MCU 50 to its original position (i.e., the slot position corresponding to the element address of the mounting target optical disc 100 that was acquired at step S601), the CPU causes the MCU 50 to move to in front of that position. Even more specifically, the CPU moves the MCU 50 to in front of the magazine position corresponding to the element address "8," that is, in front of the slot of Magazine1 shown in FIG. 5.

Step S609: In response to an instruction from the CPU, the MCU 50 returns the magazine 104 held by itself to the drawer 110. More specifically, for example, the CPU instructs the MCU 50 (moved at step S608) to mount the magazine 104 (strictly, magazine tray 101) held by itself in the slot, located in front of itself, of the drawer 110 and the MCU 50 returns the magazine 104 to its original position. Even more specifically, the CPU causes the MCU 50 to return the magazine 104 held by itself to the slot of Magazine1 shown in FIG. 5.

According to the above-described procedure, the disc apparatus 10 mounts a desired optical disc 100 in a desired optical disc drive 70.

Although it will not be described in detail, a process for returning an optical disc 100 set in an optical disc drive 70 to a magazine 104 is similar to the process that has been described above with reference to FIG. 6. More specifically, the returning process is the same as the process shown in FIG. 6 except that at a step corresponding to step S605 the DCU 60 acquires optical discs 100 that are located over the position to which the transport target optical disc 100 is to be returned and that at a step corresponding to S606 the DCU 60 acquires the optical disc 100 that is set on the tray of the optical disc drive 70. Thus, the returning process will not be described here in detail.

As described above, to mount a desired optical disc 100 in an optical disc drive 70, it is necessary for the MCU 50 to reciprocate to transport a magazine 104, that is, to move it from a slot to a DCU 60 and then return it from the DCU 60 to the slot. The processing time of these operations increases as the movement distance becomes longer depending on the position of a mounting target magazine 104 and may account for most of a transport processing time. In addition, since the disc apparatus 10 includes only one MCU 50, in mounting plural optical discs 100 in plural respective optical disc drives 70, the transport processing times to transport respective magazines 104 by the MCU 50 become one of bottlenecks that determine the total processing time.

Although the process shown in FIG. 6 was described with the assumption that every step is executed in response to an instruction from the CPU, as mentioned above each of the MCU 50 and the DCUs 60 may be equipped with a microcomputer. In this case, part of the steps can be implemented as microcomputer processing performed by the MCU 50 or a DCU 60; such a mode is possible.

Figure 7:
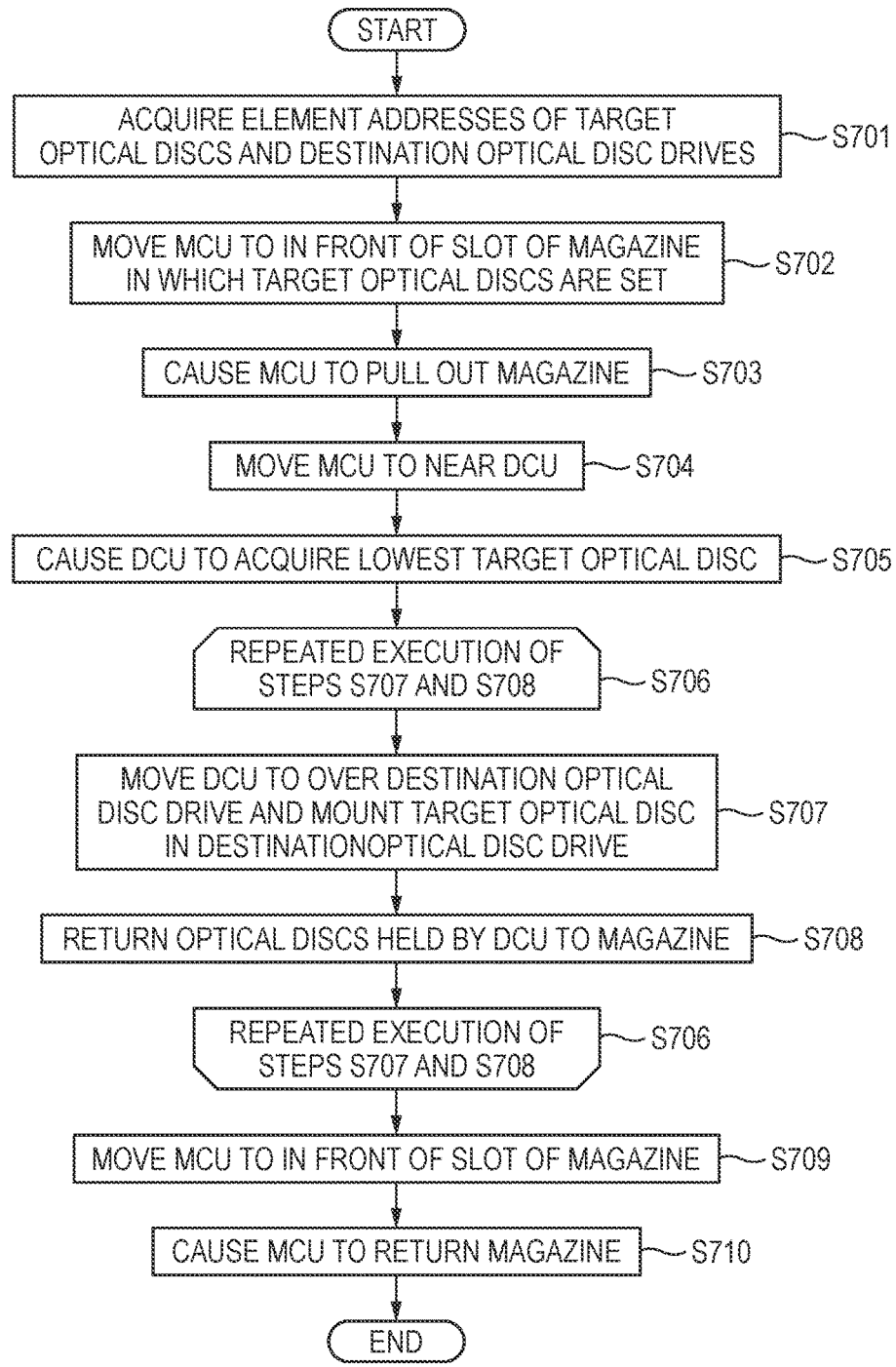
FIG. 7 is a flowchart showing the procedure of a multi-move process.

FIG. 7 is a flowchart showing the procedure of a multi-move process in which plural optical discs 100 are mounted in plural respective optical disc drives 70 en bloc. This process will be described below with an assumption that scan processing for checking whether magazines 104 have been set in the disc apparatus 10 has already been performed by the CPU.

To make it specific, the following description will be directed to an example case that a request has been issued that causes the optical discs 100 having element addresses "8" and "1," that is, the ninth and second optical discs 100 from the top (see FIG. 5) currently existing in Magazine1 (same magazine 104), to be mounted in the optical disc drives 70 having element addresses "10000" and "10001," that is, the highest optical disc drive 70 (Drive 1) and the second highest optical disc drive 70 (Drive 2) in the drive module 30 (see FIG. 5).

Step S701: The CPU identifies transport target optical discs 100 and transport destination optical disc drives 70. More specifically, for example, the CPU acquires element addresses of the transport target optical discs 100 and element addresses of transport destination optical disc drives 70 from a disc transport request such as a move medium command or a transport list setting command that is requested from the upper layer application. Even more specifically, the element addresses of the transport target optical discs 100 are "8" and "1" and the element addresses of transport destination optical disc drives 70 are "10000" and "10001."

Step S702: In response to an instruction from the CPU, the MCU 50 is moved to in front of the slot of the magazine 104 in which the target optical discs 100 are set. More specifically, for example, the CPU causes the MCU 50 to be moved to in front of the slot corresponding to the element addresses of the mounting target optical discs 100 acquired at step S701. Even more specifically, the CPU causes the MCU 50 to be moved to the position in front of Magazine1 of the drive module 30 in which the optical discs 100 having element addresses "8" and "1" shown in FIG. 5 are set.

Step S703: In response to an instruction from the CPU, the MCU 50 pulls out, from the drawer 110, the magazine 104 in which the mounting target optical discs 100 are set. This step will not be described in detail because it is the same as the above-described step S703.

Step S704: In response to an instruction from the CPU, the MCU 50 transports the magazine 104 to near the DCU 60. This step will not be described in detail because it is the same as the above-described step S704.

Step S705: In response to an instruction from the CPU, the DCU 60 acquires the lowest one of the plural transport target optical discs 100 from the MCU 50. More specifically, for example, the CPU instructs the DCU 60 to acquire optical discs 100 so that the lowest one, having the largest element address, of the transport target optical discs 100 is located at the lowest position from a maximum of 12 optical discs 100 that are set in the magazine 104 transported at step S704, that is, to acquire the lowest one of the transport target optical discs 100 and all of the optical discs 100 located over it, and the DCU 60 acquires those optical discs 100. Even more specifically, the CPU causes the DCU 60 to acquire the nine optical discs 100 in total having element addresses "0" to "8" so that the ninth optical disc 100, having the largest element address "8," of the transport target optical discs 100 is located at the lowest position from the 12 optical discs 100 that are set in Magazine 1 shown in FIG. 5. At this time, the other, transport-requested optical disc 100 having an element address "1" is also acquired by the DCU 60.

Acquiring optical discs 100 in this manner is to give each DCU 60 a function of mounting, in a transport destination optical disc drive 70, the lowest one (i.e., one optical disc 100) of the optical discs 100 held by the DCU 60. That is, the manner of acquiring a transport target optical disc 100 depends on the functions of each optical disc 100, and may be any manner as long as each DCU 60 can acquire plural transport target optical discs 100 in such a manner that they can be mounted in a transport destination optical disc drive 70 at the next step S706 and the following steps.

Step S706: Steps S707 to S708, which will be described below, are executed repeatedly for all the mounting target optical discs 100.

Step S707: In response to an instruction from the CPU, the DCU 60 mounts the transport target optical disc 100 in the transport destination optical disc drive 70. More specifically, for example, the CPU instructs the DCU 60 to open the tray lid of the mounting destination optical disc drive 70 and mount the lowest one of the optical discs 100 held by itself in the tray of the mounting destination optical disc drive 70, and the DCU 60 mounts the optical disc 100 there. Furthermore, the CPU instructs the mounting destination optical disc drive 70 to close its tray lid and activate itself.

Even more specifically, the CPU causes the DCU 60 holding the optical discs 100 to be moved to over the mounting destination optical disc drive 70 and open the tray lid of the optical disc drive 70. Subsequently, the CPU causes the DCU 60 to place the lowest one of the optical discs 100 held by itself on the tray of the optical disc drive 70, and causes the optical disc drive 70 to close its tray lid and activate itself to prepare for access to the mounted optical disc 100 mounted therein.

In the example being described, when the optical disc 100 being held by the DCU 60 at the lowest position is the optical disc 100 having an element address "1," the mounting destination optical disc drive 70 is Driver 2 having an element address "10001." When the optical disc 100 being held by the DCU 60 at the lowest position is the optical disc 100 having an element address "8," the mounting destination optical disc drive 70 is Driver 1 having an element address "10000." In this manner, the mounting target optical discs 100 are mounted in the respective mounting destination optical disc drives 70 in order of their holding positions, as defined from the bottom, in the DCU 60.

Step S708: In response to an instruction from the CPU, the DCU 60 returns, to the magazine 104, non-mounting-target optical discs 100 among the optical discs 100 held by itself currently. More specifically, if the DCU 60 holds one or more optical discs 100 including the optical disc 100 to be mounted next when the execution of step S707 has been completed, the DCU 60 returns the optical discs 100 held by itself under the mounting target optical disc 100 to the magazine 104.

At this time, if the optical discs 100 held by the DCU 60 at the lowest position is the next mounting target optical disc 100 (i.e., the next mounting target optical disc 100 is the optical disc 100 that was located immediately over the optical disc 100 that was mounted at step S707), this step is skipped. If the optical discs 100 holds no optical disc 100 to be mounted in an optical disc drive 70 next, the DCU 60 returns all the optical discs 100 held by itself to the magazine 104. If the optical discs 100 holds no optical disc 100 at all, this step is skipped.

Even more specifically, for example, where the optical disc 100 having an element address "8" was mounted in the optical disc drive 70 at step S707, when the mounting has been completed, the DCU 60 is in a state that it holds the next mounting target optical disc 100 having an element address "1." In this case, the optical discs 100 held by the DCU 60 under the next mounting target optical disc 100 (i.e., the six optical discs 100 having element addresses "2" to "7") are returned to the magazine 104 held by the MCU 50.

The DCU 60 holds no optical disc 100 to be mounted in an optical disc drive 70 next if the optical disc 100 having an element address "1" was mounted in the mounting destination optical disc drive 70 at step S707. In this case, all the optical discs 100 held by the DCU 60, that is, the one optical disc 100 having an element address "0," are returned to the magazine 104.

If the DCU 60 holds the optical disc 100 to be mounted in an optical disc drive 70 next when the execution of step S708 has been completed, the process returns to step S706 (or S707).

Step S709: In response to an instruction from the CPU, the MCU 50 transports the magazine 104 to in front of the target slot. This step will not be described in detail because it is the same as the above-described step S608.

Step S710: In response to an instruction from the CPU, the MCU 50 returns the magazine 104 held by itself to the drawer 110. This step will not be described in detail because it is the same as the above-described step S609.

According to the above-described procedure, the disc apparatus 10 mounts plural desired optical discs 100 that are set in the same magazine 104 in plural desired optical disc drives 70 as the MCU 50 reciprocates only one time to transport the magazine 104 between the slot and a DCU 60.

In the maximum case, the multi-move process allows 12 optical discs 100 (i.e., all the optical discs 100 set in the same magazine 104) to be transported at one time. That is, where there are four stages of drive modules 104 and 12 optical disc drives 70, 12 optical discs 100 can be mounted in respective optical disc drives 70 at one time as the MCU 50 reciprocates only once to transport the magazine 104. However, in this case, independent DCUs 60 are provided in the respective drive modules 30. Thus, to enable a multi-move process involving plural drive modules 30, an operation is newly necessary that the MCU 50 transports a magazine 104 in the vertical direction spanning drive modules 30 to transport a mounting target optical disc 100 to a target DCU 60. That is, in this case, it is necessary to execute step S704 etc. every time the MCU 50 enters the next spanning drive module 30.

Although it will not be described in detail, a process for returning an optical disc 100 set in an optical disc drive 70 to a magazine 104 is similar to the process that has been described above with reference to FIG. 7. The returning process is much different from the mounting process in that in the returning process optical discs 100 are returned in order of increasing element addresses. The returning process is different from the mounting process in that at a step corresponding to step S705 the DCU 60 acquires optical discs 100 located, in the target magazine 104, over a position to which a transport target optical disc 100 is to be returned, that at a step corresponding to step S707 the DCU 60 acquires the optical disc 100 set on the tray of an optical disc drive 70, and that the steps corresponding to steps S705 and S707 are executed repeatedly a number of times that is equal to the number of transport target optical discs 100. All of the other steps will not be described in detail because they are the same as in the process shown in FIG. 7.

Although the process shown in FIG. 7 was described with the assumption that each step is executed in response to an instruction from the CPU, as mentioned above each of the MCU 50 and the DCUs 60 may be equipped with a microcomputer. In this case, part of the steps can be implemented as microcomputer processing performed by the MCU 50 or a DCU 60; such a mode is possible.

As described above, where it is necessary to transport plural optical discs 100 set in the same magazine 104 and mount them in respective optical disc drives 70, in the single move process shown in FIG. 6 an operation that the MCU 50 transports the target magazine 104 needs to be performed the same number of times as the number of optical discs 100 to be mounted.

On the other hand, in the multi-move process shown in FIG. 7, even where it is necessary to transport plural optical discs 100 set in the same magazine 104 and mount them in optical disc drives 70, it suffices that an operation that the MCU 50 transports the target magazine 104 be performed only once. As such, the multi-move process is advantageous in that an operation that the MCU 50 transports the target magazine 104 (this operation takes a longest time among various transport operations) is performed only once and hence the total processing time can be reduced to a large extent.

Furthermore, in the multi-move process for transporting plural optical discs 100 set in the same magazine 104 and mounting them in respective optical disc drives 70, a case of mounting N adjacent optical discs 100 (N: integer) is advantageous over a case of mounting N non-adjacent optical discs 100 in that step S708 need not be executed and the processing time can be shortened accordingly.

Figure 8:
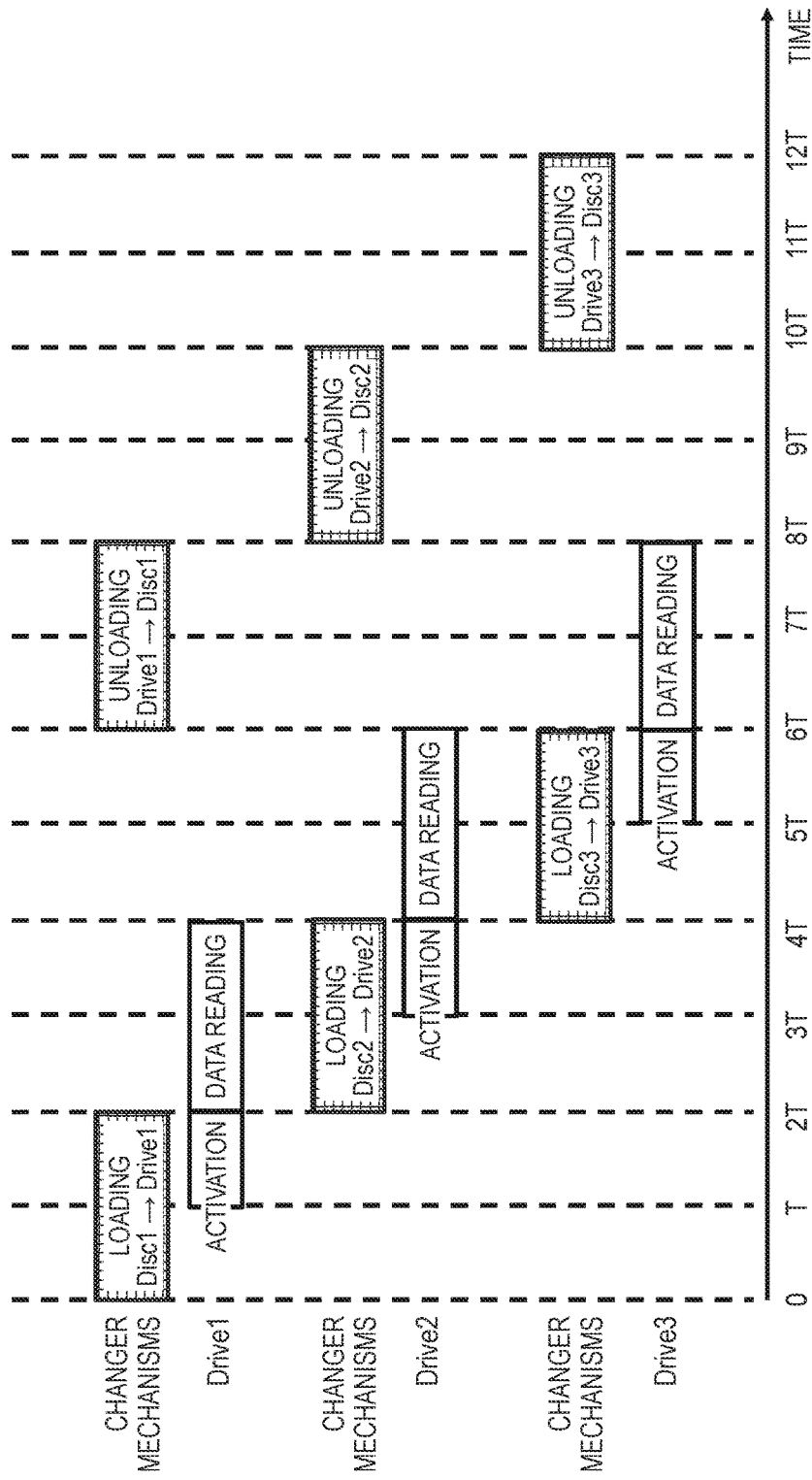
FIG. 8 is a time chart of a data recovery process that is a single move process.
Figure 9:
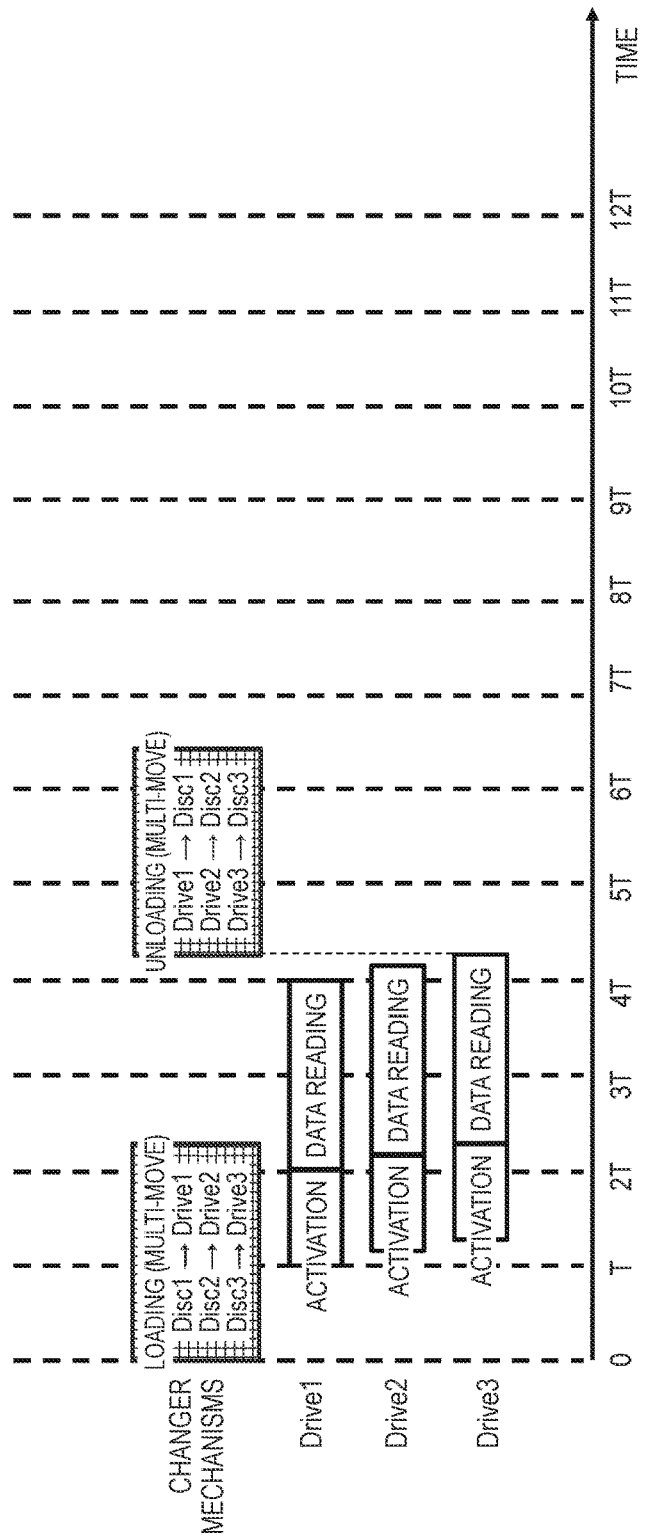
FIG. 9 is a time chart of a data recovery process that is a multi-move process.

FIG. 8 is a time chart showing, conceptually, a time that is taken to perform, using the single move process, a series of operations for data recovery on three optical discs set in the same magazine. FIG. 9 is a time chart showing, conceptually, a time that is taken to perform, using the multi-move process, a series of operations for data recovery on three optical discs set in the same magazine.

To simplify the description, in either case, it is assumed that the disc apparatus 10 shown in FIG. 5 is used, that three optical discs 100 having element addresses "0," "1," and "2" that are set in Magazine 1 are to be transported and mounted, and that the optical disc 100 (Disc 1) having an element address "2," the optical disc 100 (Disc 2) having an element address "1," and the optical disc 100 (Disc 3) having an element address "0" are transported in this order and mounted in the optical disc drive 70 (Drive 1) having an element address "10000," the optical disc drive 70 (Drive 2) having an element address "10001," and the optical disc drive 70 (Drive 3) having an element address "10002," respectively.

The above combinations of an optical disc 100 and an optical disc drive 70 in which to mount it are just an example, and the invention is not limited to it. For example, optical discs 100 held by the DCU 60 may be mounted in order from the lowest one (Disc 1) in the optical disc drives 70 provided in the same drive module 30 in order from the lowest one (Drive 3). For example, the order of optical discs 100 and the order of optical disc drives 70 may be determined according to the mechanical features of the DCU 60 so that the DCU 60 can be moved at higher speeds.

In FIGS. 8 and 9, the horizontal axis represents the elapsed time, the unit of which is made "T" to simplify the description.

A time taken by a series of operations for reading out prescribed data generally includes the following four kinds of times:

(1) A time taken by a series of operations (hereinafter referred to as a "loading operation") for mounting a target optical disc(s) 100 in an optical disc drive(s) 70 using the MCU 50 and the DCU 60 (changer mechanisms).

(2) A time taken by a series of operations (hereinafter referred to as an "unloading operation") for returning the optical disc(s) 100 from the optical disc drive(s) 70 using the MCU 50 and the DCU 60 (changer mechanisms).

(3) A time taken for the optical disc drive 70 to activate itself to make the optical disc 100 accessible.

(4) A time taken for the optical disc drive 70 to read data (hereinafter referred to as a "data reading operation").

Since the set of changer mechanisms and the optical disc drive 70 work independently of each other, part of the above operations can be performed in parallel. The processing time can be shortened by performing parallel operations.

Loading operations (and unloading operations) shown in FIG. 8 are equivalent to the corresponding operation that was described above with reference to FIG. 6 and loading operations (and unloading operations) shown in FIG. 9 are equivalent to the corresponding operations that were described above with reference to FIG. 7. In the example single move process shown in FIG. 8, each of the loading operation of item (1) and the unloading process of item (2) takes a time 2T.

In the example multi-move process shown in FIG. 9, each of the loading operation of item (1) and the unloading process of item (2) takes a little longer time than in the example single move process shown in FIG. 8 because plural optical discs 100 are to be mounted, that is, a little longer time than 2T. Furthermore, in each of the cases of FIGS. 8 and 9, the activation operation (spin up operation) of item (3) takes a time 1T and the data reading operation of item (4) takes a time 2T.

Although FIG. 8 is drawn in such a manner that each loading operation and each data reading operation take a time 2T, this is for convenience of description; it is noted that this does not mean that they take the same time actually. A similar thing is true of that FIG. 8 is drawn in such a manner that each activation operation takes half of the time taken by each loading operation and each data reading operation.

In the example single move process shown in FIG. 8, after Disc 1 has been mounted in Drive 1 by a loading operation, Drive 1 can perform an activation operation even if the changer mechanisms are still doing an operation of item (1); these operations can be performed in parallel. Thus, the time taken until completion of data reading from Disc 1 is equal to 4T. Upon completion of the loading operation on Disc 1, a loading operation on Disc 2 is started. Disc 2 and Disc 3 are mounted in Drive 2 and Drive 3, respectively, according to this procedure, and the time taken to complete loading operations on all of the three optical discs 100 is equal to 6T. At this time point, the data reading operation on Disc 1 by Drive 1 on which the first loading operation was performed has already been completed. Thus, the changer mechanisms that have completed the loading operations can immediately start an unloading operation on each optical disc 100 upon completion of a data reading operation on it.

According to the above procedure, the total processing time to complete all the operations amounts to 12T. This time is equal to an operation time taken for the changer mechanisms to load and unload the three optical discs 100. This is because all of the activation operations and the data reading operations of the optical disc drives 70 are fully performed parallel with the operations of the changer mechanisms and hence no part of the processing times of the optical disc drives 70 adds to the operation time of the changer mechanisms.

On the other hand, in the example multi-move process shown in FIG. 9, the time taken to perform a loading operation on the three optical discs 100 is a little longer than 2T. On the other hand, sets of an activation operation and a data reading operation of the respective optical disc drives 70 are performed in order from the set of Drive 1 in which an optical disc 100 (Disc 1) is mounted first. In this case, the time taken until completion of data reading from Disc 1 by Drive 1 is equal to 4T as in the case of the example single move process shown in FIG. 8. At this time point, the changer mechanisms are ready for operation. However, in the example multi-move process, unloading operations can be started upon completion of data reading operations on all the target optical discs 100. Thus, the unloading operations are started upon completion of the data reading operation on Disc 3 by Drive 3. According to this procedure, the total time to completion of all operations amounts to longer than or equal to 6T and shorter than 7T.

As described above, by using the multi-move process, the total processing time of three optical discs 100 can be made very much shorter than in the case of using only the single move process.

In recent years, such data as personal contents stored on clouds have increased rapidly because of explosive spread of digital data and many data centers for storing such data have been constructed. Storages used in such data centers etc. are required to store data safely for a long time at a low cost. Storages such as the disc apparatus 10 are used broadly for such purposes as archives (for long-term storage) and backup devices of such data as photographs and videos because of such advantages as a low cost and high reliability of long-term data storage because of the use of optical discs.

Let's think about a case that such a storage is used for a backup purpose. In this case, there should separately exist a main storage that stores original data. In general, such a storage as hard disk drives or solid-state drives is used as the main storage and deals with writing and reading requests etc. from users. If a failure occurs or data are lost in part of the main storage, lost data are recovered from the backup storage. Thus, it is important to storages such as the disc apparatus 10 for backup use in how short a time necessary data can be recovered (i.e., to what extent the recovery time can be shortened).

In a recovery process, if, for example, data to be recovered have no priority ranks and all data should merely be read out from all optical discs 100 and if the disc apparatus 10 includes 12 optical disc drives 70, 12 optical discs 100 can be mounted in the 12 respective optical disc drives 70 by executing the above-described 12-disc multi-move process. This makes it possible to make the processing time very much shorter than in a case that the 12 optical discs 100 are mounted one by one by the single move process.

As for the data recording method of the disc apparatus 10, a recording method called erasure coding or RAID is used frequently which employs plural disc apparatus and has such redundancy as to be capable of data protection even in the event of a failure or an abnormality in a storage. In this case, it is a common practice that a series of data such as photographs or video data of a certain person are recorded so as to span plural optical discs or plural disc apparatus. In other words, in performing data recovery, it is necessary to read data from plural optical discs or plural disc apparatus. Since a upper layer application has information indicating how much data exist for the data recovery and where those data are recorded, the data necessary for the data recovery are read out from the disc apparatus in order according to instructions from the upper layer application.

Furthermore, there is a case that data necessary for data recovery are given priority order (priority ranks), that is, they are weighted. For example, data of premium members or paying members of cloud services or newly recorded data are given higher priority. In performing data recovery in such a case, "in how short a time all data necessary for recovery can be read out in prescribed order" is an important issue.

Where data are recorded by such a method as erasure recording, a technique of recording only high-priority data together in a particular optical disc(s) cannot be employed. And there may occur a case that priority order is not fixed yet when data are recorded. In these cases, high-priority data are recorded discretely in plural optical discs. Data recovery is performed in such a manner that data are read out according to priority order from the data that are recorded discretely in the plural optical discs. Where a data recovery process is executed simply according to only priority rank information, basically, an operation of transporting an optical disc 100 containing data to be read out (reading data) by the changer mechanisms is performed by the single move process. Thus, as described above, disc transport processing times of the changer mechanisms become a bottleneck and hence the recovery speed cannot be increased drastically.

To solve this problem, the embodiment of the invention makes it possible to read out all data necessary for recovery efficiently in a short time while keeping priority ranks of recovery data by using the single move process and the multi-move process alternately using, among other things, position information (equivalent to element addresses), in the disc apparatus 10, of optical discs 100 in which data necessary for recovery are recorded and information indicating the number of optical disc drives 70 provided in the disc apparatus 10 in addition to basic information, that is, a list of the data necessary for recovery and information indicating their priority ranks.

A specific method of the above measure will be described below.

Figure 10:
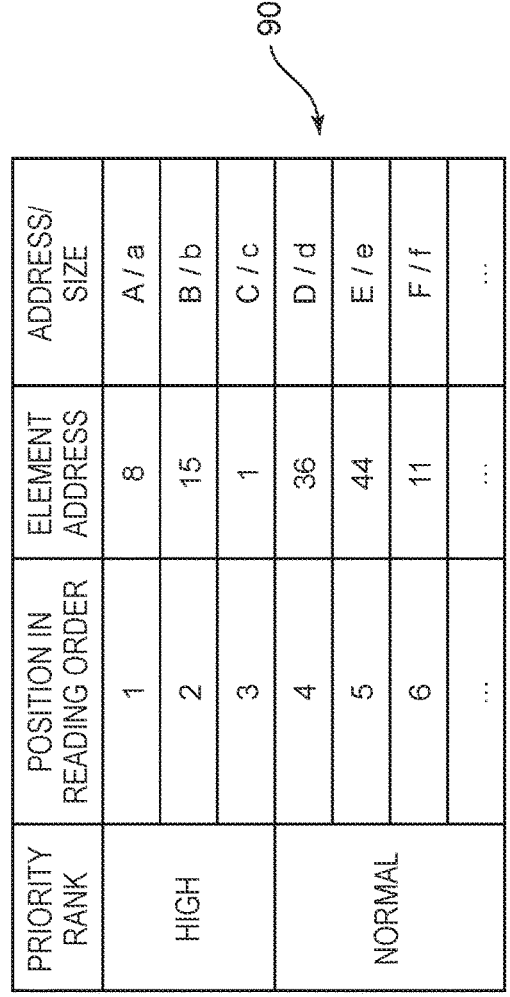
FIG. 10 illustrates an example recovery table.

FIG. 10 illustrates an example recovery table 90. FIG. 11 is an imagery diagram illustrating a specific arrangement, in the disc apparatus 10, of data indicated by the recovery table 90 shown in FIG. 10. It is assumed that the disc apparatus 10 described below is equivalent in configuration to that shown in FIG. 5.

The recovery table 90 is information that is generated and managed by a upper layer application, and is a reading data list having a list of data necessary for data recovery. The recovery table 90 contains element address information of optical discs 100 where all data necessary for recovery are stored and information relating to areas of these optical discs 100 where those data are stored (e.g., head LBAs (logical block addresses) which are address information) and size information) together with information relating to reading order and priority ranks of those data. In general, information relating to priority ranks is at one of two levels ("high" and "ordinary"). However, the number of levels may vary depending on the system characteristics and may be any number.

As shown in FIGS. 10 and 11, the data necessary for recovery are arranged discretely in plural optical discs 100 that are set in plural magazines 104. Although for convenience of description FIG. 11 is such that optical discs 100 stored with the data necessary for recovery are set in only three magazines 104, in actuality the data necessary for recovery may be stored discretely in more magazines 104 of the disc apparatus 10.

Figure 12:
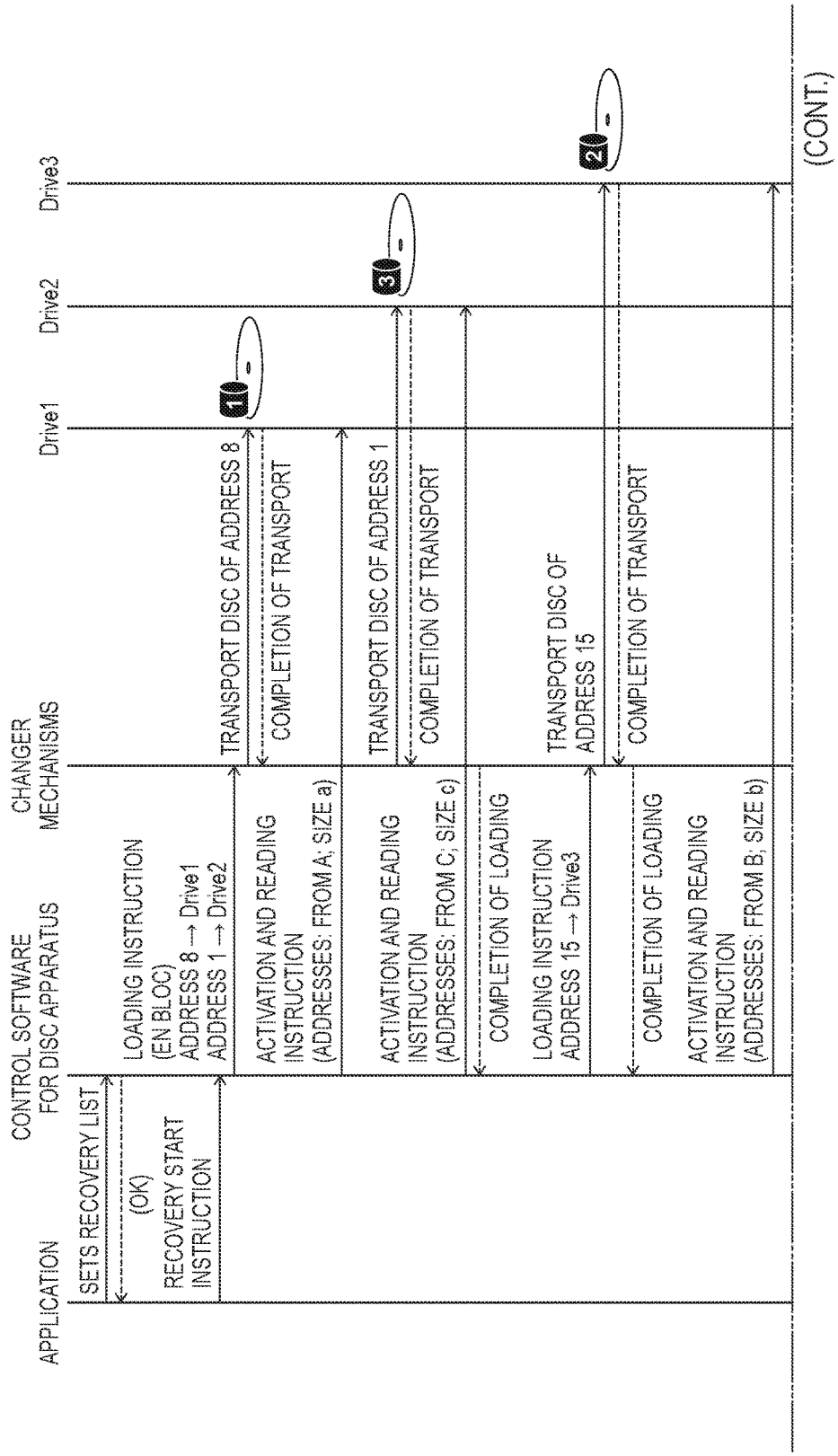
FIG. 12 is a sequence diagram showing the procedure of an example recovery process for data that are high in priority.
Figure 13:
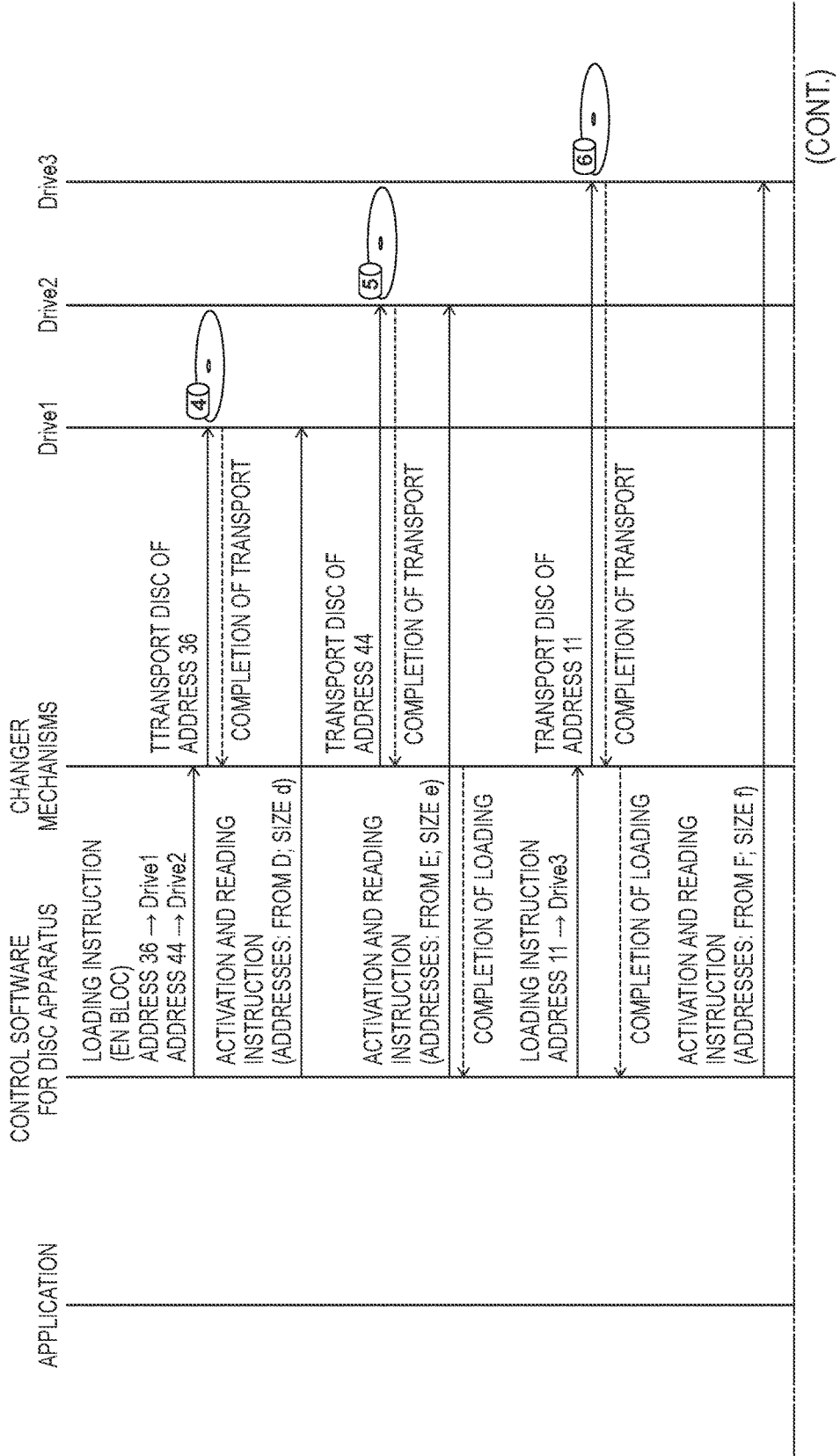
FIG. 13 is a sequence diagram showing the procedure of an example recovery process for data that are low in priority.

FIGS. 12 and 13 are sequence diagrams showing, in a simplified manner, the procedure of an example data recovery process to be executed by the disc apparatus 10. In this example, the disc apparatus 10 (more specifically, software on the CPU of the controller server 40 which controls the disc apparatus 10) performs recovery while judging the order of data recovery and other things.

In this example, the upper layer application can instruct the disc apparatus 10 in two steps generally. As shown in FIG. 12, first, the information of the recovery table 90 is conveyed from the upper layer application to the disc apparatus 10. Then the upper layer application instructs the disc apparatus 10 to execute a data recovery process.

On the side of the disc apparatus 10, first, the software (in charge of the data recovery process) on the CPU of the controller server 40 stores, in, for example, an internal memory (not shown), the information of the recovery table 90 conveyed from the upper layer application. Then, triggered by an instruction, received subsequently, to start the data recovery process, the software executes the data recovery process according to the recovery table 90.

The CPU carries out the data recovery by performing operations basically in the same order as prescribed in the recovery table 90, with the following exceptional, characteristic operation. Where the optical discs 100 included in a list of recovery target data having the same priority rank (e.g., data having the priority rank "high") includes plural ones that are set in the same magazine 104 physically, the CPU processes these optical discs 100 en bloc using the multi-move process by changing the reading order prescribed in the recovery table 90.

For example, in the embodiment of the invention, since 12 optical discs 100 are set in each magazine 104, 12 consecutive element addresses are assigned to the optical discs 100 set in the same magazine 104. Utilizing this feature, the CPU can recognize whether there exist optical discs 100 that are set in the same magazine 104 among the reading target optical discs 100 listed up in the recovery table 90.

More specifically, in the example shown in FIGS. 10 and 11, two optical discs 100 having the same priority rank "high" are set in Magazine 1. They are the optical disc 100 that has an element address "8" and is to be read out first and the optical disc 100 that has an element address "1" and is to be read out third. In this case, as shown in FIG. 12, the recovery processing time is shortened by performing a control so that these two optical discs 100 are transported en bloc using the multi-move function and the number of times of operation of the changer mechanisms is thereby decreased.

Although the optical disc 100 having an element address "11" and the priority rank "ordinary" and listed up in the recovery table 90 is also set in Magazine1, this optical disc 100 is not subjected to the multi-move operation because it is different in priority rank from the above two optical discs 100. This is to prevent delay in data reading from the two optical discs 100 having the priority rank "high," though it is possible to also transport the optical disc 100 having an element address "11" in the multi-move operation.

That is, where the data recovery is performed according to the recovery table 90 shown in FIG. 10 using the disc apparatus 10 shown in FIG. 5 which has three optical disc drives 70, first, data are read from the three optical discs 100 having the priority rank "high." More specifically, as shown in FIG. 12, the optical discs 100 having element addresses "8" and "1" are transported (loaded) by the multi-move process, the optical disc drives 70 in which the respective optical discs 100 have been mounted are activated, and data having specified sizes are read out starting from addresses indicated in the recovery table 90, respectively. Then the optical disc 100 having an element address "15" is transported (loaded) by the single move process, the optical disc drive 70 in which the optical disc 100 has been mounted is activated, and data having a specified size is read out starting from an address indicated in the recovery table 90.

By performing the above controls, the number of disc transport operations performed by the changer mechanisms can be made smaller approximately by one than in a case that the data are read out from the three optical discs 100 having the priority rank "high" using only the single move process, whereby the time taken until completion of data reading from all the optical discs 100 having the priority rank "high."

Immediately after completion of the data reading from all the optical discs 100 having the priority rank "high," the optical discs 100 mounted in the respective optical disc drives 70 are transported (unloaded) to their original magazines 104. Then, as shown in FIG. 13, data are read out from the optical discs 100 having the priority rank "ordinary." In this example, the optical discs 100 having element addresses "36" and "44" are transported (loaded) by the multi-move process, the optical disc drives 70 in which the respective optical discs 100 have been mounted are activated, and data having specified sizes are read out starting from addresses indicated in the recovery table 90, respectively. Then the optical disc 100 having an element address "11" is transported (loaded) by the single move process, the optical disc drive 70 in which the optical disc 100 has been mounted is activated, and data having a specified size is read out starting from an address indicated in the recovery table 90.

For example, where data recovery is performed using only the single move process, the time taken until completion of the operations of reading data from the six optical discs 100 in total shown in the recovery table 90 (see FIG. 10) amounts to two times the total processing time of the process shown in FIG. 8, that is, 24T, because the time taken to perform data recovery on each of the set of three optical discs 100 having the priority rank "high" and the set of three optical discs 100 having the priority rank "ordinary" is equal to the total processing time of the process shown in FIG. 8 with an assumption that data reading from an optical disc 100 always takes 2T. (Strictly speaking, a processing time of 20T is taken until completion of reading of all the recovery data.)

Figure 14:
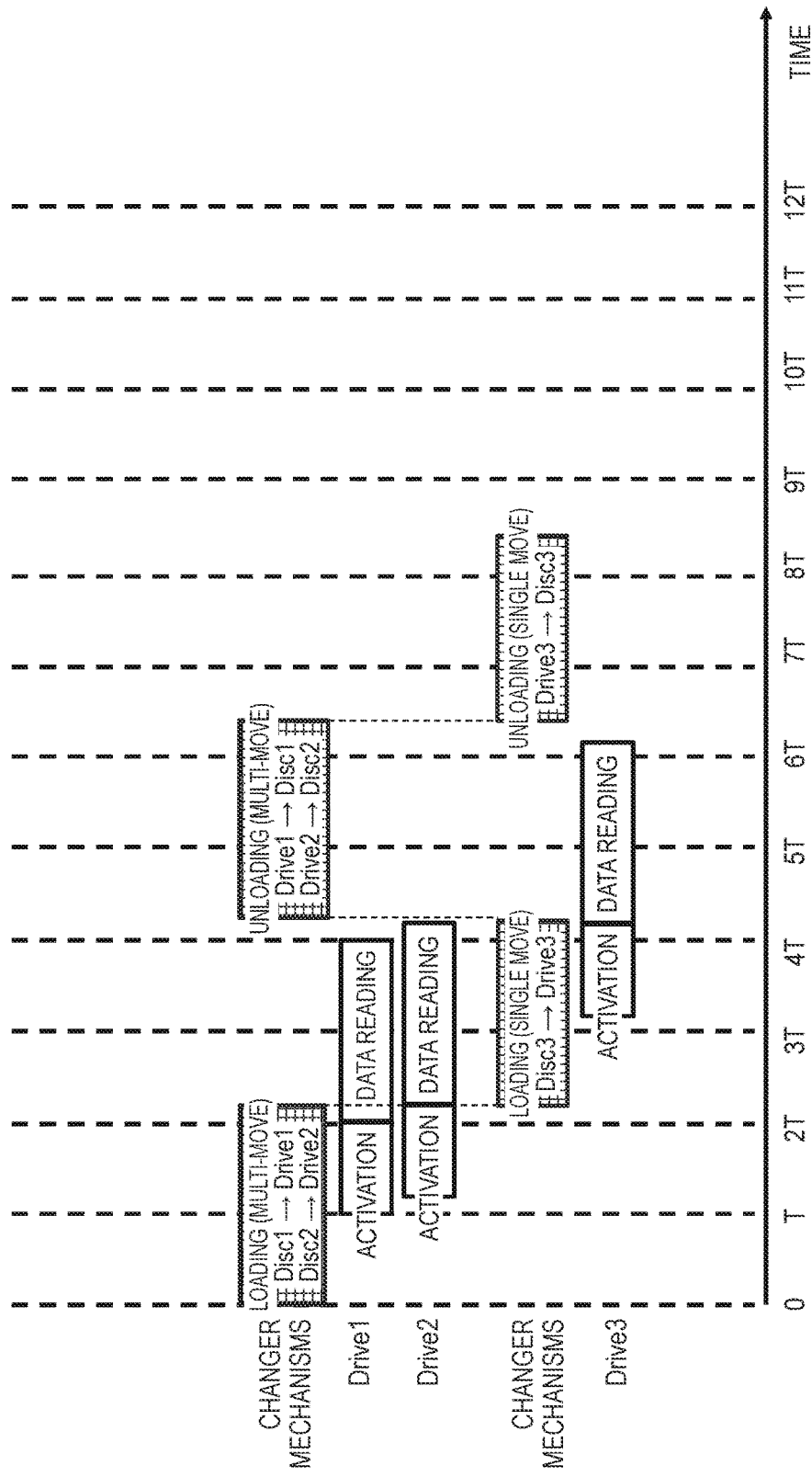
FIG. 14 is a time chart of the case that data recovery is performed as a combination of multi-move operations and single move operations.

On the other hand, where the high-priority data are read out also using the multi-move process (the priority ranks are taken into consideration), data recovery is performed as shown in a time chart of FIG. 14 as a process that is a combination of a multi-move operations and single move operations. The time taken to perform data recovery on each of the set of three optical discs 100 having the priority rank "high" and the set of three optical discs 100 having the priority rank "ordinary" is longer than 8T, and hence the data recovery relating to all of the six optical discs 100 amounts to two times the above time, that is, 17T. (Strictly speaking, a processing time of about 15T is taken until completion of reading of all the recovery data.)

As described above, the number of times of operation of the changer mechanisms can be reduced by combining the single move process and the multi-move process properly for disc transport. In the example of FIG. 14, the processing time can be shortened by more than 5T. It goes without saying that the reduction in the number of times of operation of the changer mechanisms can be reduced is effective at not only shortening the processing time but also suppressing the wear of the changer mechanisms and thereby elongating their life.

Although not described above in detail, in performing data recovery, also the upper layer application side needs to recognize to what extent a recovery process has progressed and whether it has become possible to return data to the user. In particular, in the embodiment of this disclosure, the upper layer application side requires certain process for recognizing to what extent a data recovery process has progressed because the upper layer application issues a data recover instruction only once and the disc apparatus 10 side thereafter performs a data recovery process on its own. The upper layer application can recognize to what extent the disc apparatus 10 has executed a data recovery process by, for example, sending a status check instruction (command) to the disc apparatus 10 checking reading-completed data files or the like generated in, for example, a memory of the controller server 40.

Whereas in the embodiment the software on the CPU of the controller server 40 which controls the disc apparatus 10 executes a data recovery process according to the recovery table 90, it is possible for the upper layer application side to perform such a sequential control for data recovery. Where the upper layer application side performs controls, whereas the step of notifying the disc apparatus 10 side of the information of the recovery table 90 (see FIG. 12) is not necessary, the upper layer application needs to instruct the changer mechanisms to transport an optical disc 100 and instruct an optical disc drive 70 to read out data. In this case, the upper layer application can naturally recognize to what extent a data recovery process has progressed.

Attention should be paid to the fact that the recovery table 90 need not contain information indicating optical disc drives 70 in which to load respective optical discs 100. In the above descriptions of the procedures of the disc mounting processes shown in FIGS. 6 and 7, the upper layer application issues information (element address(es)) indicating an optical disc drive(s) 70 in which to mount an optical disc(s) 100. In data recovery processes, it is not always necessary for the upper layer application to specify optical disc drives 70. In other words, in a data recovery process according to the embodiment of the invention, what optical discs 100 should be mounted in what optical disc drives 70 to perform data reading for data recovery is judged by the software on the CPU of the controller server 40 by recognizing current use statuses of the respective optical disc drives 70 of the disc apparatus 10.

More specifically, for example, when data recovery is performed, it is probable that part of the optical disc drives 70 of the disc apparatus 10 is or are being used for another or other purposes at the same time (e.g., other data are being recorded in or reproduced from a disc apparatus 10). In view of the fact that such a situation may occur, data recovery can be performed in a shortest time if the software on the CPU of the controller server 40 controls usable optical disc drives 70 so that they are used most efficiently, according to which of the optical disc drives 70 of the disc apparatus 10 are free in starting the data recovery.

More specifically, for example, if only two optical disc drives 70 are usable for data recovery of the example shown in FIGS. 10 and 11, a more efficient procedure is as follows. As in the process shown in FIGS. 12 and 13, first, the two optical discs 100 having the priority rank "high" and element addresses "8" and "1" are transported by the multi-move process and data relating to them are recovered. If the optical disc 100 having the priority rank "high" and an element address "15" is thereafter used for data recovery using the single move process, only one optical disc drive 70 remains usable currently in the disc apparatus 10. Thus, it is more efficient to perform data recovery using the optical disc 100 having an element address "11" before performing data recovery using the optical discs 100 having element addresses "36" and "44" by the multi-move process. In this manner, a procedure may be employed that optical disc drives 70 to be mounted in optical disc drives 70 are determined according to which optical disc drive 70 are available and, if necessary, the order of use of optical discs 100 for data recovery is changed to optimum order.

Which optical discs 100 to use may be judged by the upper layer application side in view of current use statuses of the respective optical disc drives 70. That is, the recovery table 90 may contain information indicating optical disc drives 70 in which to load respective optical discs 100. Alternatively, which optical discs 100 to use may be determined in such a manner that the upper layer application directly performs a sequence control for data recovery. These two methods can provide the same advantages.

Figure 15:
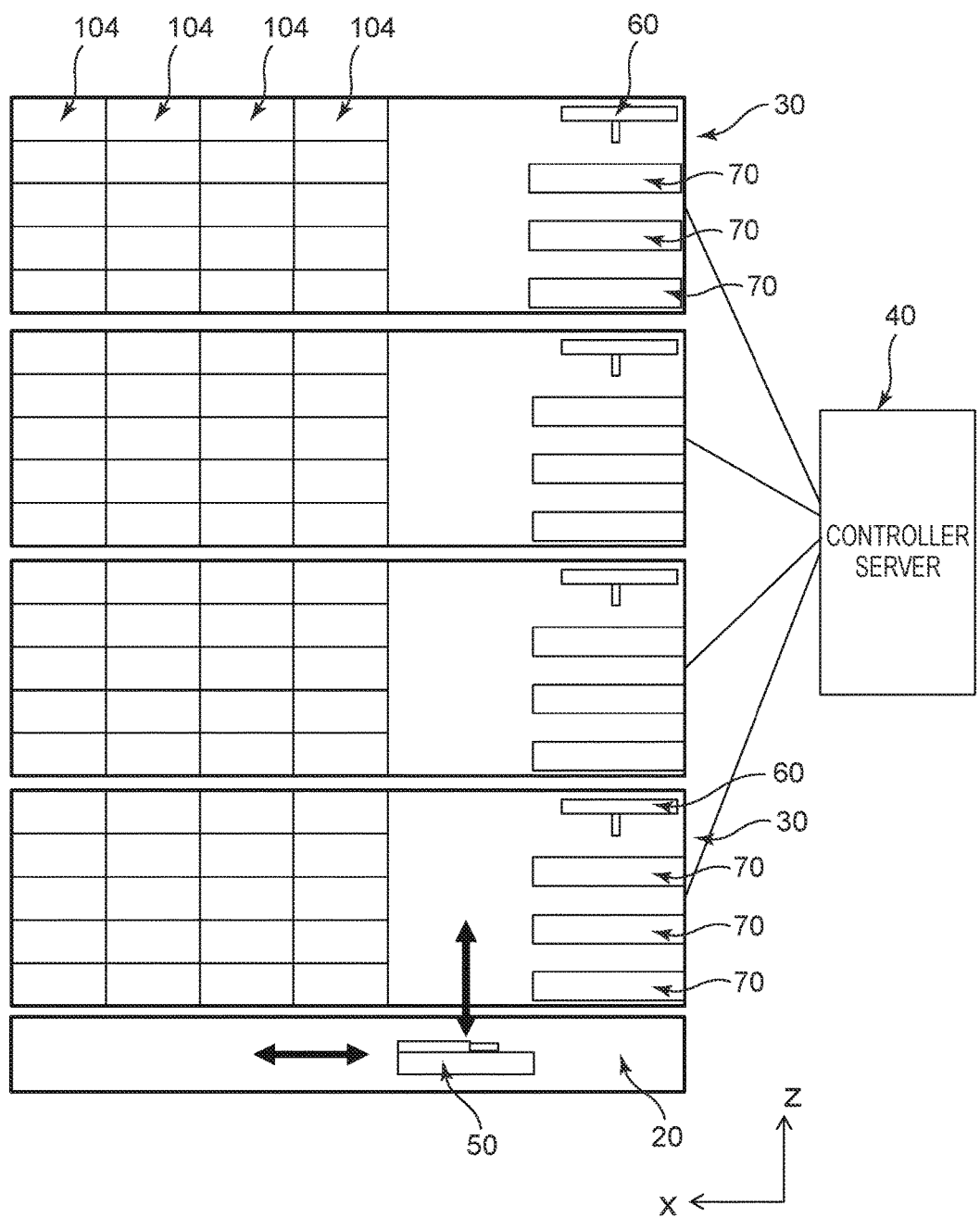
FIG. 15 is a schematic diagram of a disc apparatus that includes four stages of drive modules.

Next, a description will be made of a case of a disc apparatus 10 that includes plural drive modules 30 and more optical disc drives 70. FIG. 15 is a schematic diagram of a disc apparatus 10 that includes four stages of drive modules 30. That is, whereas two stages of drive modules 30 are provided in the configuration of FIG. 3, four stages of drive modules 30 are provided in the configuration of FIG. 15. Since the disc apparatus 10 shown in FIG. 15 are equipped with the same kinds of constituent elements as that shown in FIG. 3, the constituent elements of the disc apparatus 10 shown in FIG. 15 will not be described.

Figure 16:
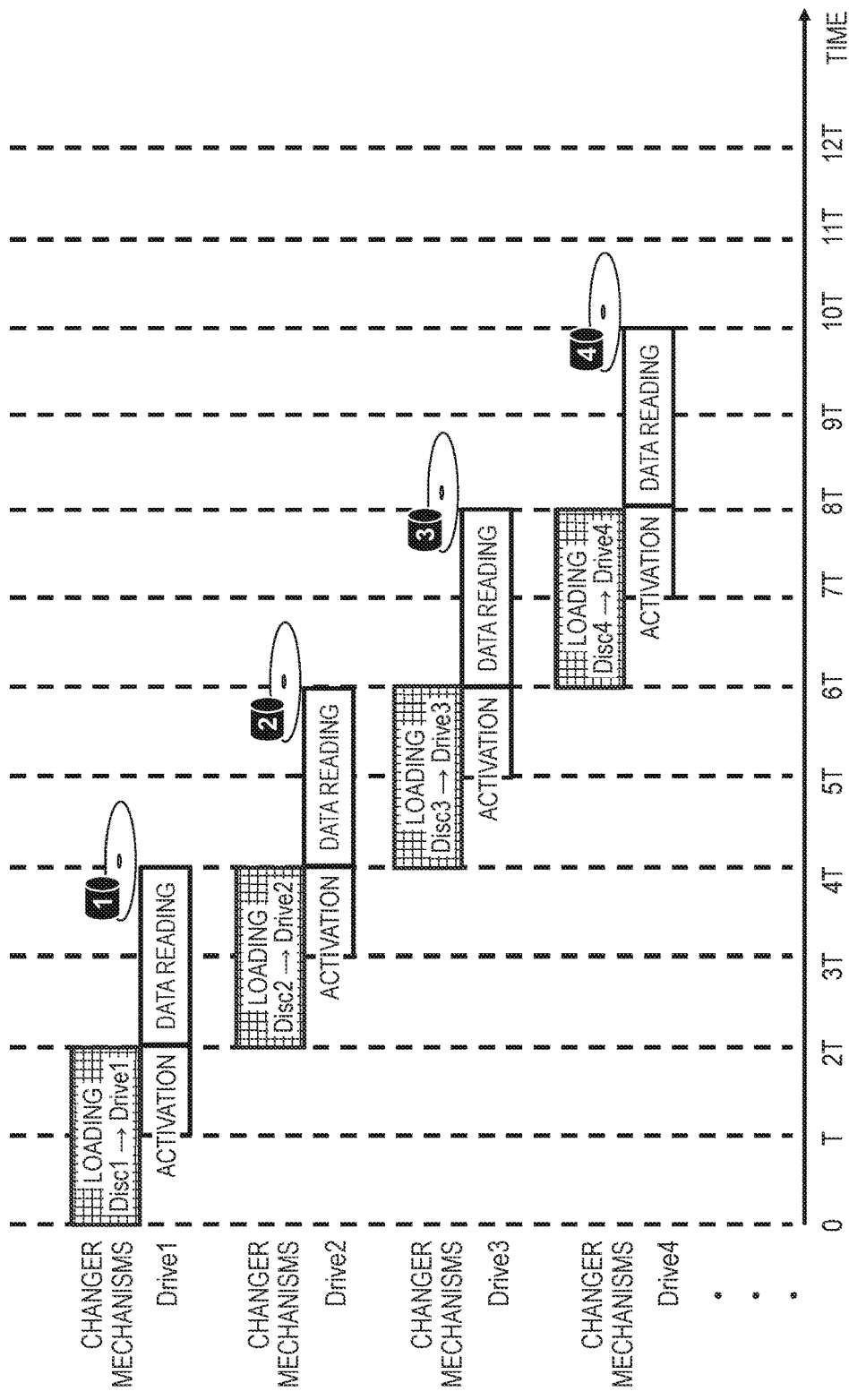
FIG. 16 is a time chart showing a data recovery process of a case that the single move process is used.
Figure 17:
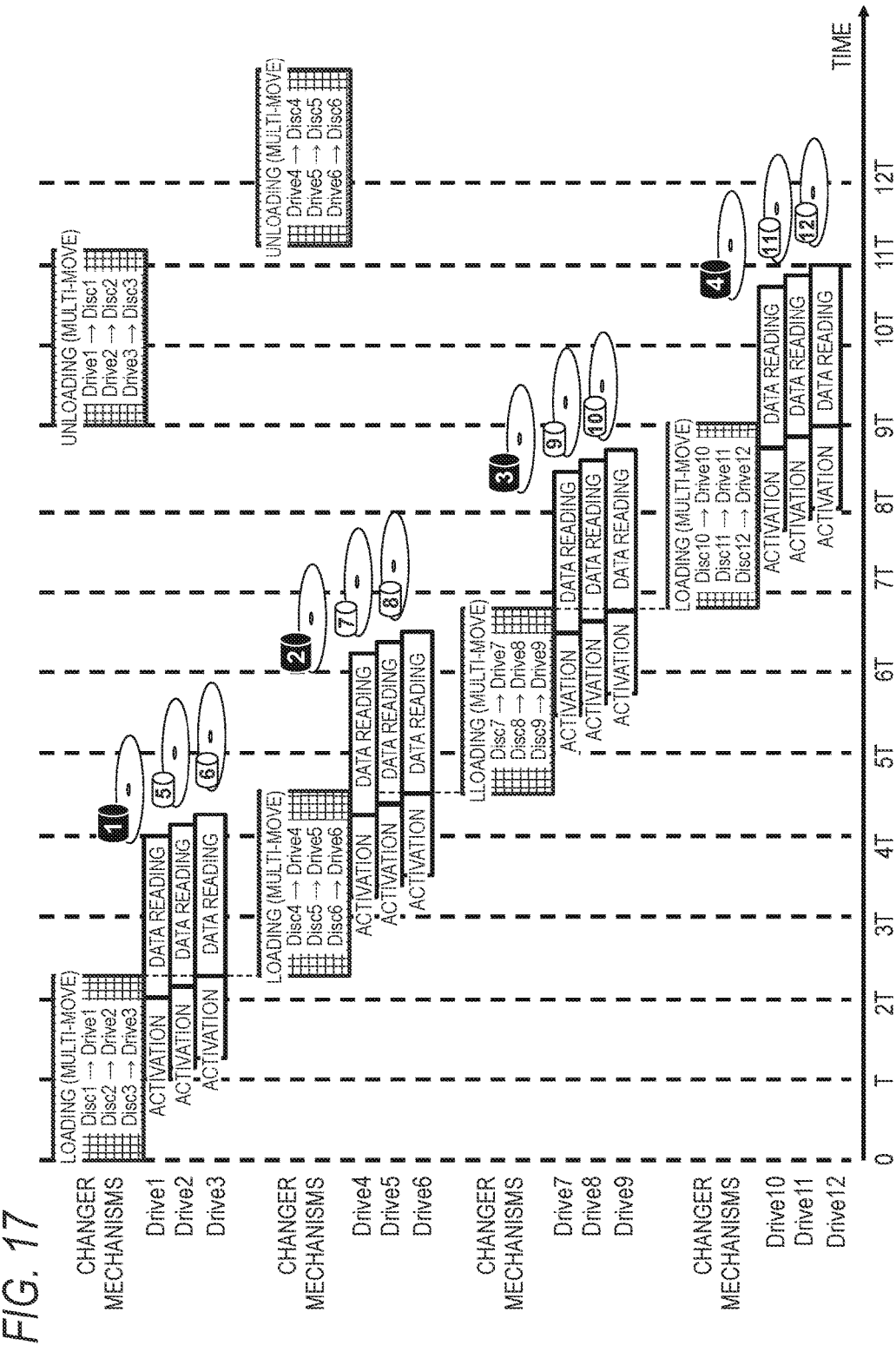
FIG. 17 is a time chart showing a data recovery process of a case that the multi-move process is used.

FIGS. 16 and 17 are conceptual time charts each of which illustrates a time taken by four changer mechanism operations (more specifically, four reciprocating operations of the MCU 50 for transporting magazines 104) and data that can be recovered. In other words, FIGS. 16 and 17 are time charts each of which illustrates a time that is taken to transport optical discs 100 from a maximum of four different magazines 104. FIG. 16 illustrates a case that changer mechanism operations are single move operations, and FIG. 17 illustrates a case that changer mechanism operations are multi-move operations. It is assumed that the times taken by loading, unloading, activation, and data reading are the same as described above with reference to FIG. 8 or 9.

In the process shown in FIG. 17, three optical discs 100 are mounted in the three respective optical disc drives 70 provided in the same drive module 30 by one multi-move operation. That is, there does not occur an operation that the DCU 60 moves spanning plural drive modules 30 and hence one multi-move operation takes approximately the same time as a single move operation for mounting one optical disc 100.

As shown in FIG. 16, four single move operations which can mount four optical discs 100 take a time 8T until completion of their mounting. And it takes a time 10T until completion of data reading from those optical discs 100.

On the other hand, as shown in FIG. 17, four multi-move operations which can mount 12 optical discs 100 take a time of about 9T until completion of their mounting. And it takes a time 11T until completion of data reading from those optical discs 100.

That is, the case of using the multi-move process can mount optical discs 100 in all the optical disc drives 70 of the disc apparatus 10 in the processing time that is longer than in the case of using the single move process by 1T (penalty time). This means that the total processing time is similar to that in the case of using the single move process because the data recovery can be performed at a triple speed.

More specifically, in the example shown in FIG. 17, the operations of reading recovery data by the three optical disc drives 70 in which optical discs 100 were mounted first have already been completed at a time point when optical discs 100 have just been mounted in the six optical disc drives 70. Thus, as long as the disc apparatus 10 includes six or more optical disc drives 70, the bottleneck that determines the recovery processing time is the changer mechanism operation time. That is, as well as the optical disc drives 70 in the disc apparatus 10, the changer mechanisms can be utilized effectively without causing waiting times.

For example, three optical discs 100 can be mounted in the case of using the single move process (see FIG. 16) in the same period as six optical discs 100 are mounted and data are read out from them in the case of using the multi-move process (see FIG. 17). That is, in the same period, the use of the multi-move process makes it possible to use three or more optical disc drives 70 additionally and finish reading of recovery data from the three or more optical discs 100 earlier.

Now consider an example case that data need to be read out from all the optical discs 100 set in the disc apparatus 10 and reading data have priority order. In this case, as shown in FIG. 16, the time taken to mount, in optical disc drives 70, four optical discs 100 that are set in different magazines 104 and have the priority rank "high" by the single move process and to read recovery data from them is equal to 10T. In contrast, as shown in FIG. 17, if three adjacent optical discs 100 set in the same magazine 104 and including an optical disc 100 having the priority rank "high" are mounted in respective optical disc drives 70 by the multi-move process and recovery data are read out from them, the reading of recovery data from 12 optical discs 100 in total including not only four optical discs 100 having the priority rank "high" but also eight optical discs 100 having the priority rank "ordinary" can be completed in a time 11T.

Figure 18:
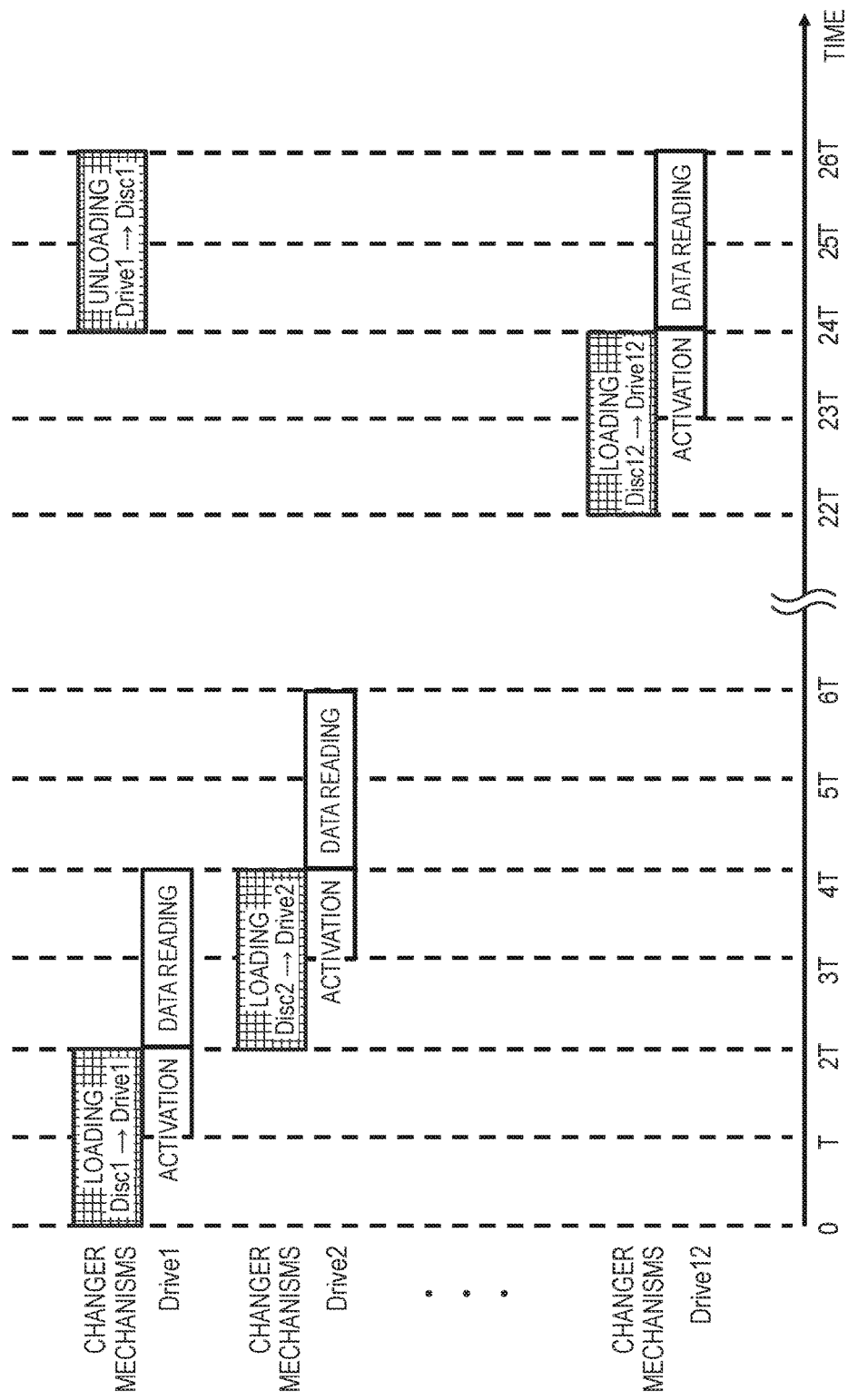
FIG. 18 is a time chart showing a data recovery process in which recovery data are read out from 12 optical discs using the single move process.

As shown in FIG. 18, the time taken to complete reading for recovery data from 12 optical discs 100 using the single move process is equal to 26T. Through comparison with this time, it is seen that by using the multi-move process the recovery process can be finished in a very short time of 11T as shown in FIG. 17.

The data recovery using only the data having the priority rank "high" can be completed earlier in the process shown in FIG. 16 which uses the single move process. However, in the process shown in FIG. 17 which uses the multi-move process, the total data recovery time can be shortened drastically whereas the data recovery using only the data having the priority rank "high" can be completed in a time (including a penalty time of 1T) that is similar to the time that is taken in the case of using the single move process. Thus, it can be said that the process shown in FIG. 17 is very well balanced, effective method from a total point of view.

In the process shown in FIG. 17, three adjacent optical discs 100 set in the same magazine 104 and including an optical disc 100 having the priority rank "high" are mounted in respective optical disc drives 70 by the multi-move process. This is because this process is of a case that the data recovery requires data reading from all the optical discs 100. In a case that data recovery is performed using limited optical discs 100, as described above, three non-adjacent optical discs 100 that are set in the same magazine 104 and are to be subjected to data reading for data recovery may be transported by the multi-move process. In this case, the transport processing time becomes longer than in a case of mounting three adjacent optical discs 100 in respective optical disc drives 70 by a time taken by loading operations and unloading operations (step S708 shown in FIG. 7). However, it goes without saying that the same advantages can still be obtained with approximately the same processing time as in the process shown in FIG. 18.

Now consider a case that data recovery requires data reading from all the optical discs 100 set in the disc apparatus 10 as in the above-described case and optical discs 100 having the priority rank "high" are very small in number, in other words, most of the optical discs 100 have the priority rank "ordinary." In this case, most of the optical discs 100 set in a certain magazine 104 have the priority rank "ordinary."

In this case, for example, data recovery may be performed in such a manner that data recovery using the optical discs 100 having the priority rank "high" is performed using the single move process and data recovery using the optical discs 100 having the priority rank "ordinary" which account for most of all the optical discs 100 is performed in such a manner that all the 12 optical discs 100 set in each magazine 104 are mounted in respective optical disc drives 70 by a collective multi-move operation. This is because the multi-move operation of mounting the 12 optical discs 100 en block is more effective and can be completed in a shorter time than a process that the 12 optical discs 100 are mounted by performing a 3-disc multi-move operation four times.

In this case, although the optical discs 100 set in a magazine 104 may include an optical disc 100 having the priority rank "high" that has already been used for data recovery, the 12 optical discs 100 may still be mounted by a collective multi-move operation. This is because mounting only the optical discs 100 having the priority rank "ordinary" avoiding the optical disc 100 that has already been used for data recovery to produce a free optical disc drive 70 that is inconvenient to use is not very advantageous, and because non-occurrence of step S708 of the multi-move process shown in FIG. 7 contributes to increase in processing speed.

Although the case that data recovery requires data reading from all the optical discs 100 set in the disc apparatus 10 and optical discs 100 having the priority rank "high" are very small in number has been described above, it goes without saying that the same is true of an opposite case that optical discs 100 having the priority rank "ordinary" are very small in number, that is, most of all the optical discs 100 have the priority rank "high."

The embodiment has been described above as example techniques of the disclosure and the detailed description and the accompanying drawings are provided for this purpose.

Thus, the constituent elements employed in the detailed description and the accompanying drawings may include not only ones that are indispensable for solving the problems but also ones that are employed to merely exemplify the above techniques and are not indispensable for solving the problems. It is therefore improper to regard the dispensable constituent elements as indispensable only based on the fact that the former are employed in the detailed description and the accompanying drawings.

Furthermore, since the embodiment is intended to exemplify the techniques of the disclosure, various modifications, replacements, additions, omissions, etc. are possible within the confines of the claims and equivalents thereof.

The disclosure of this application can be applied to industrial fields that use information recording media in the form of an information reproduction apparatus or an information reproduction method for reading out information stored in information recording media such as optical discs.

What is claimed is:

1. An information reproduction method for reading out data from a disc apparatus containing plural optical discs as information recording media,
wherein the disc apparatus is configured to set plural magazines therein at respective setting positions of the disc apparatus;
wherein the optical discs are set in the magazines in each of which plural optical discs can be set;
wherein the disc apparatus comprises:
plural drives each of which is configured to perform recording and reproduction on an optical disc set therein; and
a changer mechanism configured to transport a magazine between its setting position and one or more drives and mounts and remove a prescribed optical disc or discs in and from the one or more drives by performing either one of a single move process and a multi-move process;
wherein in the single move process, a prescribed optical disc that is set in the magazine is transported and mounted in and released from the drive while the magazine is reciprocated once between its setting position and the drive;
wherein in the multi-move process, prescribed N optical discs that are set in the magazine are transported and mounted in and released from N respective drives while the magazine is reciprocated once between its setting position and the drives, N being an integer that is larger than or equal to 2, the information reproduction method, comprising:

judging whether to conduct the single move process or the multi-move process as a transport process for transporting optical discs to respective drives to read data from them based on use statuses of the respective drives and a reading data list, the reading data list containing disc information that enables identification of optical discs storing reading data to be read out, area information relating to areas, where the reading data are recorded, on the optical discs indicated by the disc information, and priority information indicating priority ranks of the reading data; and controlling the disc apparatus so that data are read out preferentially in the order of high priority rank indicated by the priority information.

2. The information reproduction method according to claim 1, wherein magazine information indicating a relation between the magazines and discs set in each of the corresponding magazines can be calculated based on the disc information contained in the reading data list; and the information reproduction method further comprising:

performing controls so that plural optical discs are mounted in and released from the plural drives by the multi-move process and data are read out from the optical discs mounted in the drives according to the area information contained in the reading data list, if the reading data list shows that optical discs exist that are the same in priority information and magazine information; and performing controls so that one optical disc is mounted in and released from the drive by the single move process and data are read out from the optical disc mounted in the drive according to the area information contained in the reading data list, if the reading data list shows that no optical discs exist that are the same in priority information and magazine information.

3. The information reproduction method according to claim 1, wherein the reading data list contains position information that indicates positions of the discs, in which data necessary for recovery are recorded, in the information reproduction apparatus.

4. The information reproduction method according to claim 1, wherein whether to conduct the single move process or the multi-move process is judged based on information indicating the number of the drives provided in the disc apparatus in addition to the use statuses of the respective drives and the reading data list.

5. An information reproduction apparatus which contains plural optical discs as information recording media, the information reproduction apparatus comprising:

plural magazines configured to be set at respective setting positions thereof, wherein the optical discs are set in the magazines in each of which plural optical discs can be set;

plural drives each of which is configured to perform recording and reproduction on an optical disc set therein;

a changer mechanism configured to transport a magazine between its setting position and one or more drives and mounts and remove a prescribed optical disc or discs in and from the one or more drives by performing either one of a single move process and a multi-move process; and a controller including a program that controls the information reproduction apparatus, wherein in the single move process, a prescribed optical disc that is set in the magazine is transported and mounted in and released from the drive while the magazine is reciprocated once between its setting position and the drive;

wherein in the multi-move process, prescribed N optical discs that are set in the magazine are transported and mounted in and released from N respective drives while the magazine is reciprocated once between its setting position and the drives, N being an integer that is larger than or equal to 2;

wherein the controller stores a reading data list information relating to all data to be read out, the reading data list containing disc information that enables identification of optical discs storing reading data to be read out, area information relating to areas, where the reading data are recorded, on the optical discs indicated by the disc information, and priority information indicating priority ranks of the reading data; and wherein the controller judges whether to conduct the single move process or the multi-move process as a transport process for transporting optical discs to respective drives to read data from them based on the reading data list and use statuses of the respective drives, and performs controls so that data are read out preferentially in the order of high priority rank indicated by the priority information.

6. The information reproduction apparatus according to claim 5, wherein magazine information indicating a relation between the magazines and discs set in each of the corresponding magazines can be calculated based on the disc information contained in the reading data list;

wherein the controller performs controls so that plural optical discs are mounted in and released from the plural drives by the multi-move process and data are read out from the optical discs mounted in the drives according to the area information contained in the reading data list, if the reading data list shows that optical discs exist that are the same in priority information and magazine information; and wherein the controller performs controls so that one optical disc is mounted in and released from the drive by the single move process and data are read out from the optical disc mounted in the drive according to the area information contained in the reading data list, if the reading data list shows that no optical discs exist that are the same in priority information and magazine information.

7. The information reproduction apparatus according to claim 5, wherein the reading data list contains position information that indicates positions of the discs, in which data necessary for recovery are recorded, in the information reproduction apparatus.

8. The information reproduction apparatus according to claim 5, wherein the controller judges whether to conduct the single move process or the multi-move process based on information indicating the number of the drives provided in the disc apparatus in addition to the use statuses of the respective drives and the reading data list.

* * * * *